United States Patent
Powell et al.

(10) Patent No.: US 8,231,224 B2
(45) Date of Patent: Jul. 31, 2012

(54) APPARENT SPECKLE REDUCTION VIA BEAM OFFSET DIVERSITY IN PUPIL SPACE

(75) Inventors: Karlton D. Powell, Lake Stevens, WA (US); Mark O. Freeman, Snohomish, WA (US); Alban N. Lescure, Redmond, WA (US)

(73) Assignee: Microvision, Inc., Redmond, WA (US)

( * ) Notice: Subject to any disclaimer, the term of this patent is extended or adjusted under 35 U.S.C. 154(b) by 596 days.

(21) Appl. No.: 12/482,998

(22) Filed: Jun. 11, 2009

(65) Prior Publication Data

US 2010/0315597 A1 Dec. 16, 2010

(51) Int. Cl.
*G03B 21/24* (2006.01)
*G02B 5/02* (2006.01)
*G02B 13/20* (2006.01)

(52) U.S. Cl. .......................... 353/20; 359/599; 359/707
(58) Field of Classification Search ............... 353/20, 353/31, 33, 75, 81, 84, 97, 94, 77, 78, 98, 353/99, 122; 359/599, 707; 348/201, 206, 348/210.99, 266
See application file for complete search history.

(56) References Cited

U.S. PATENT DOCUMENTS

| | | | | |
|---|---|---|---|---|
| 8,029,146 B2* | 10/2011 | Yamauchi et al. | .............. | 353/99 |
| 2006/0023164 A1* | 2/2006 | Sakaguchi et al. | .............. | 353/20 |
| 2006/0126022 A1* | 6/2006 | Govorkov et al. | .............. | 353/31 |
| 2008/0158513 A1 | 7/2008 | Bartlett et al. | | |
| 2008/0198334 A1* | 8/2008 | Kasazumi et al. | .............. | 353/38 |
| 2009/0034041 A1 | 2/2009 | Grasser | | |
| 2009/0168818 A1* | 7/2009 | Gollier et al. | ................... | 372/27 |
| 2009/0268168 A1* | 10/2009 | Wang | .............................. | 353/37 |
| 2010/0014054 A1* | 1/2010 | Lapchuk et al. | ................ | 353/20 |

OTHER PUBLICATIONS

Dingel, Benjamin et al., "Speckle-Free Image in a Laser Diode Microscope by Using the Optical Feedback Effect", *Optical Letters*, vol. 18, No. 7 Apr. 1, 1993, 549-551.
Jones, R. J. et al., "Influence on External Cavity Length on the Coherence Collapse Regime in Laser Diodes Subject to Optical Feedback", *IEE Proc-Optoelectron*, vol. 148, No. 1 Feb. 1, 2001, 7-12.
Trisnadi, Jahja I. et al., "Speckle Contrast Reduction in Laser Projection Displays", *SPIE* vol. 4657 Apr. 26, 2002.
Volker, A.C. et al., "Laser Speckle Imaging with an Active Noise Reduction Scheme", *Optics Express*, vol. 13, No. 24, Nov. 15, 2005, 9782-9787.
Woodward, S. L. et al., "The Onset of Coherence Collapse in DBR Lasers", *IEEE Photonics Technology Letters*, vol. 2, No. 6 Jun. 1, 1990, 391-394.

* cited by examiner

*Primary Examiner* — Francis M Legasse, Jr.
*Assistant Examiner* — Bao-Luan Le
(74) *Attorney, Agent, or Firm* — Kevin D. Wills

(57) ABSTRACT

Briefly, in accordance with one or more embodiments, beam position diversity or beam offset diversity in pupil space performs the complement to angular diversity by maintaining angular content of a beam while changing its position and/or polarization properties in pupil space over time.

3 Claims, 20 Drawing Sheets

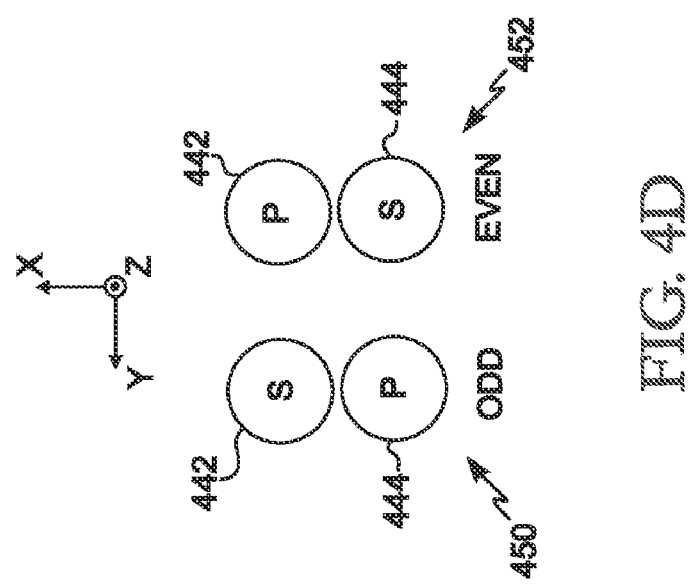
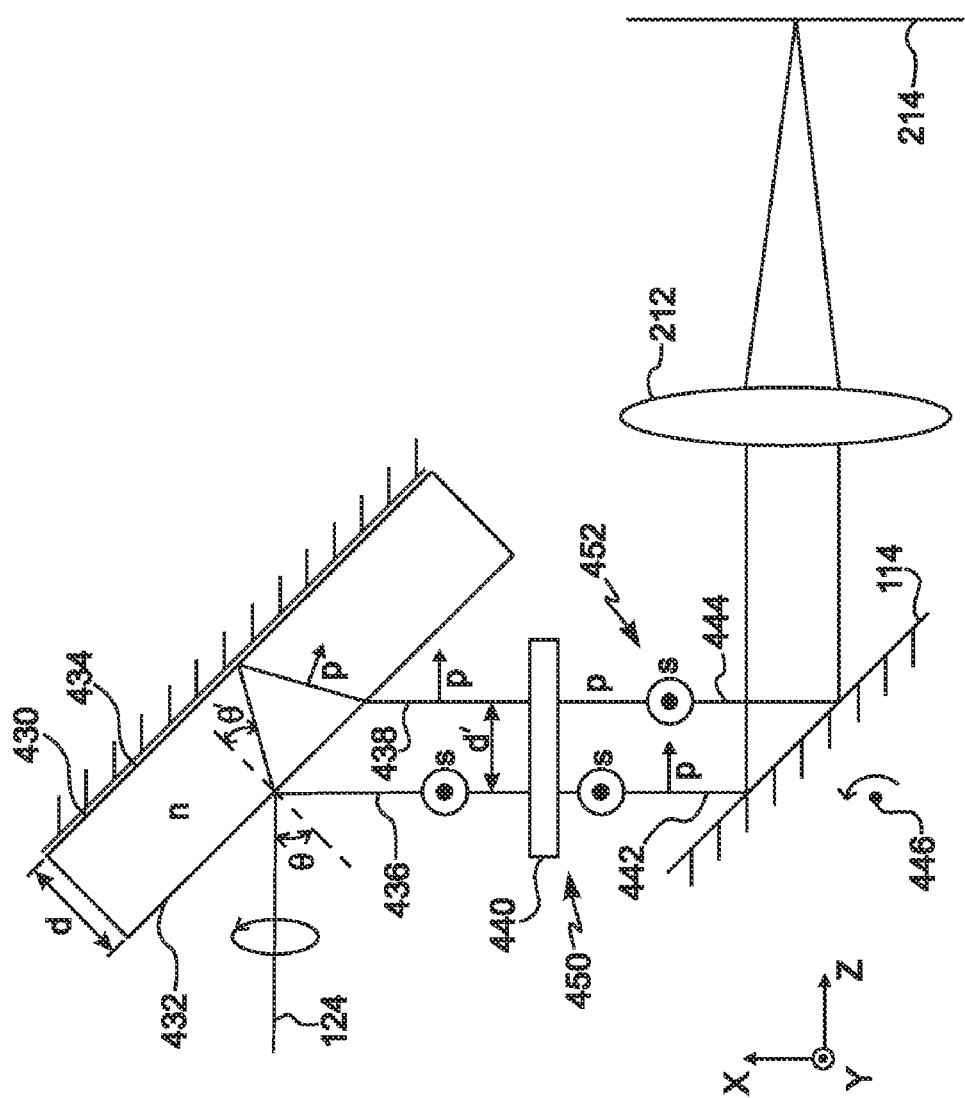
FIG. 4D
FIG. 4C

APPARENT SPECKLE REDUCTION VIA BEAM OFFSET DIVERSITY IN PUPIL SPACE

BACKGROUND

Typically, most speckle reduction techniques rely on the use of an image plane or a relayed image of the source. A time-averaging diffuser wheel is a common way to average speckle, but it acts as a random array of scatter centers, maintaining x-y position of the beam while redistributing the angular content of the beam over time to average multiple differing speckle patterns over time. Thus, on average, the beam intensity can be measured across x-y position with reduced impact of interference effects of speckle. Angular Diversity is discussed in many references as a way to mitigate speckle. Angular Diversity involves maintaining x-y position of a spot in image space while changing its angular properties over time.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 4C is a scanned laser display using a PBS plate as shown in FIG. 4A showing an alternative embodiment thereof in accordance with one or more embodiments;

FIG. 4D is a diagram of the beam polarization for alternating frames achieved by the scanned laser display of FIG. 4C in accordance with one or more embodiments;

Figure 9A:
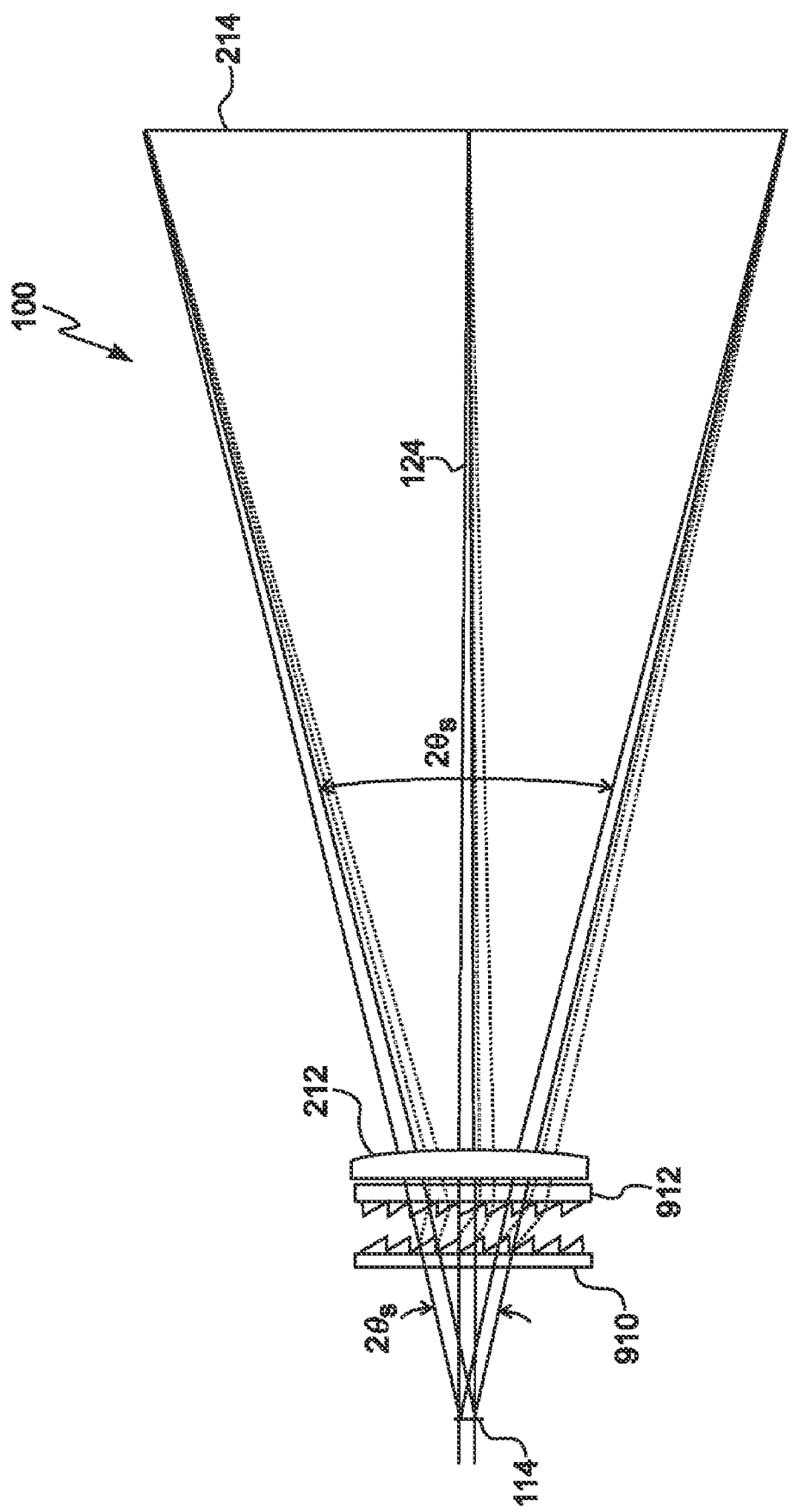
FIG. 9A is a diagram of a scanned laser display using opposed spatial light modulators disposed at a separation distance to provide apparent speckle reduction via offset diversity in pupil space in accordance with one or more embodiments.
Figure 9D:
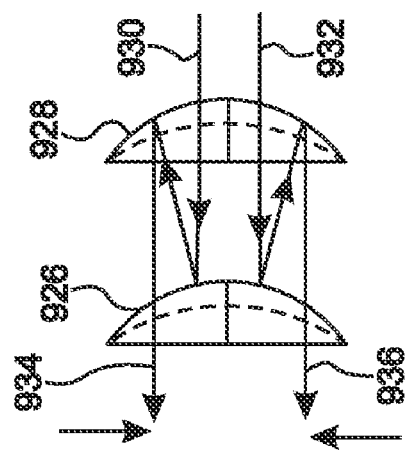
FIG. 9B is a diagram of the beam spots of the scanned laser display of FIG. 9A showing a four state time series for 2D wedges in accordance with one or more embodiments.
FIG. 9C is a diagram of the beam spots of the scanned laser display of FIG. 9A showing a two state time series for 2D conics in accordance with one or more embodiments.
Figure 10:
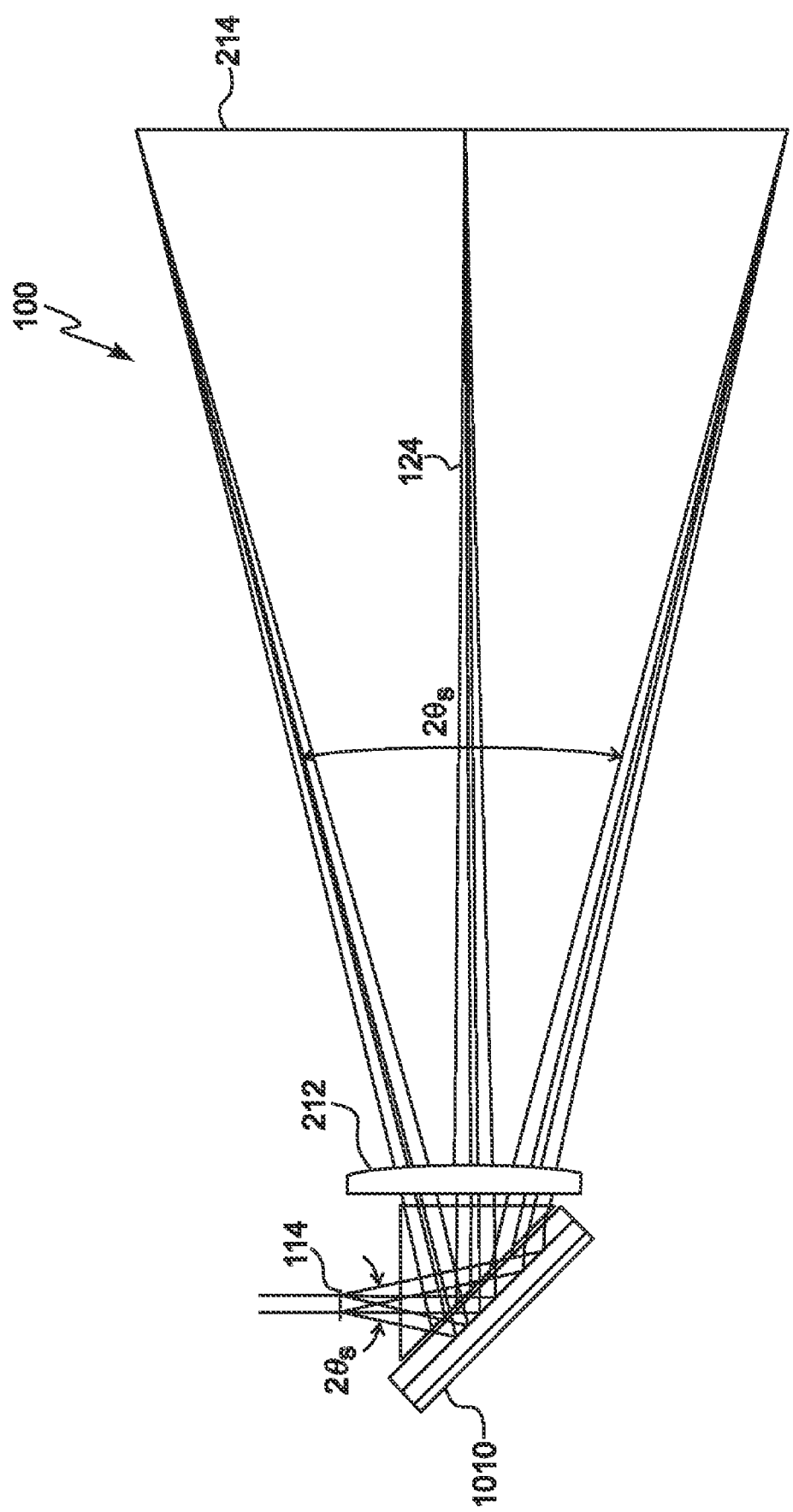

FIG. 9D is a diagram of a variable beam expander of a scanned laser display to vary the beam output size over time to provide apparent speckle reduction via offset diversity in pupil space in accordance with one or more embodiments; and FIG. 10 is a diagram of a scanned laser display using electrical beam position switching using a frustrated total internal reflection (TIR) element to provide apparent speckle reduction via offset diversity in pupil space in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
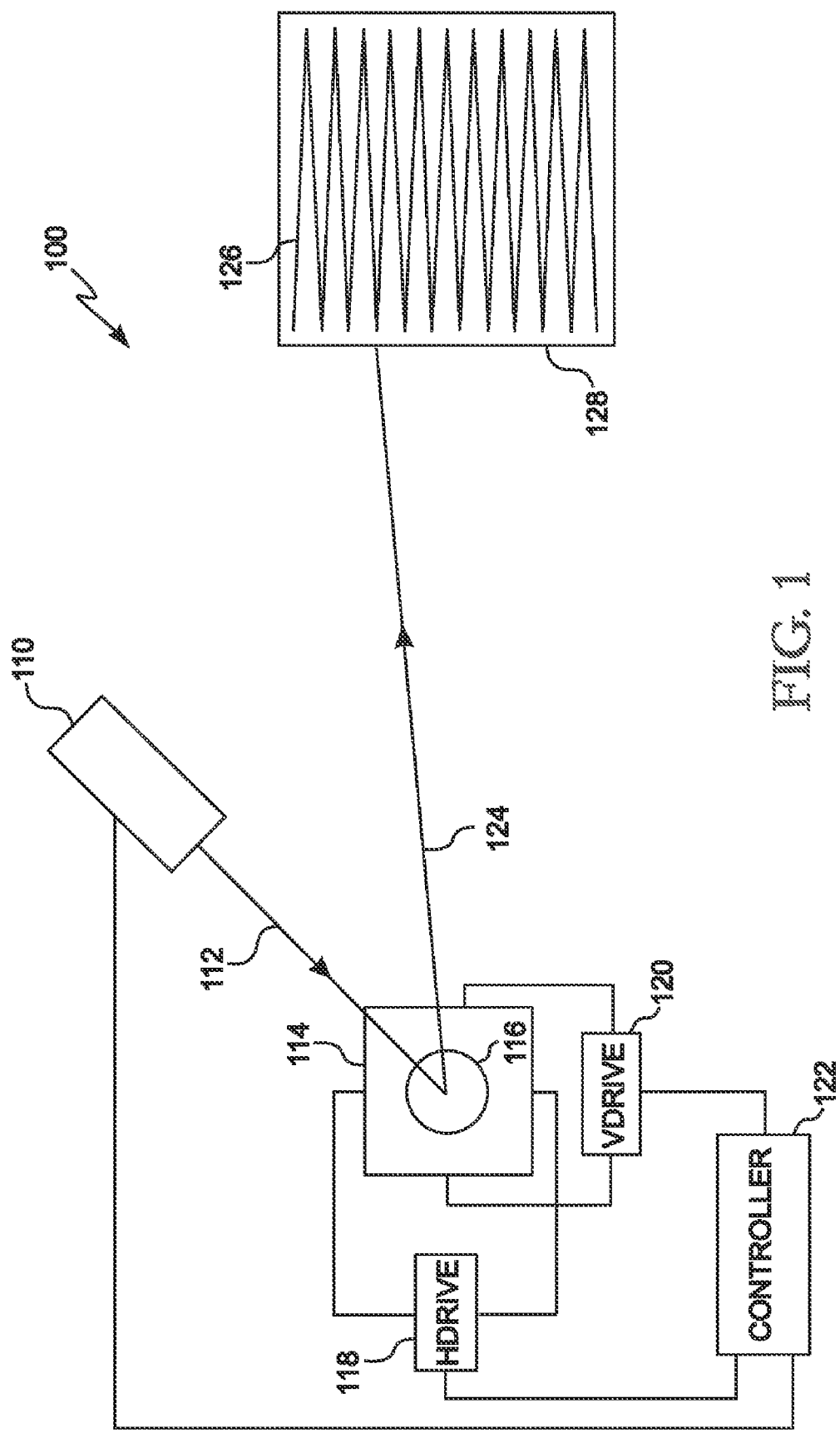
FIG. 1 is a diagram of a scanned laser display in accordance with one or more embodiments.

Referring now to FIG. 1, a diagram of a scanned laser display in accordance with one or more embodiments will be discussed. Although FIG. 1 illustrates one type of a scanned beam display system for purposes of discussion, for example a microelectromechanical system (MEMS) based display, it should be noted that other types of displays can benefit from the use of offset diversity in pupil space when used in conjunction with laser sources, such as a liquid crystal display (LCD), liquid crystal on silicon (LCOS) display, or a digital light projector (DLP), as one of many examples, and the scope of the claimed subject matter is not limited in this respect.

As shown in FIG. 1, scanned beam display 100 comprises a light source 110, which may be a laser light source such as a laser or the like, capable of emitting a beam 112 which may comprise a laser beam. In some embodiments, light source may comprise two or more light sources, such as in a color system having red, green, and blue light sources, wherein the beams from the light sources may be combined into a single beam. The beam 112 impinges on a scanning platform 114 which may comprise a microelectromechanical system (MEMS) based scanner or the like in one or more embodiments, and reflects off of scanning mirror 116 to generate a controlled output beam 124. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon device, or other similar scanning devices. A horizontal drive circuit 118 and/or a vertical drive circuit 120 modulate the direction in which scanning mirror 116 is deflected to cause output beam 124 to generate a raster scan 126, thereby creating a displayed image 128, for example on a projection surface and/or image plane. A display controller 122 controls horizontal drive circuit 118 and vertical drive circuit 120 by converting pixel information of the displayed image into laser modulation synchronous to the scanning platform 114 to write the image information as displayed image 128 based upon the position of the output beam 124 in raster pattern 126 and the corresponding intensity and/or color information at the corresponding pixel in the image. Display controller 122 may also control other various functions of scanned beam display 100.

In one or more embodiments, for two dimensional scanning to generate a two dimensional image, a fast scan axis may refer to the horizontal direction of raster scan 126 and the slow scan axis may refer to the vertical direction of raster scan 126. Scanning mirror 116 may sweep the output beam 124 horizontally at a relatively higher frequency and also vertically at a relatively lower frequency. The result is a scanned trajectory of laser beam 124 to result in raster scan 126. However, the scope of the claimed subject matter is not limited in these respects.

Figure 2:
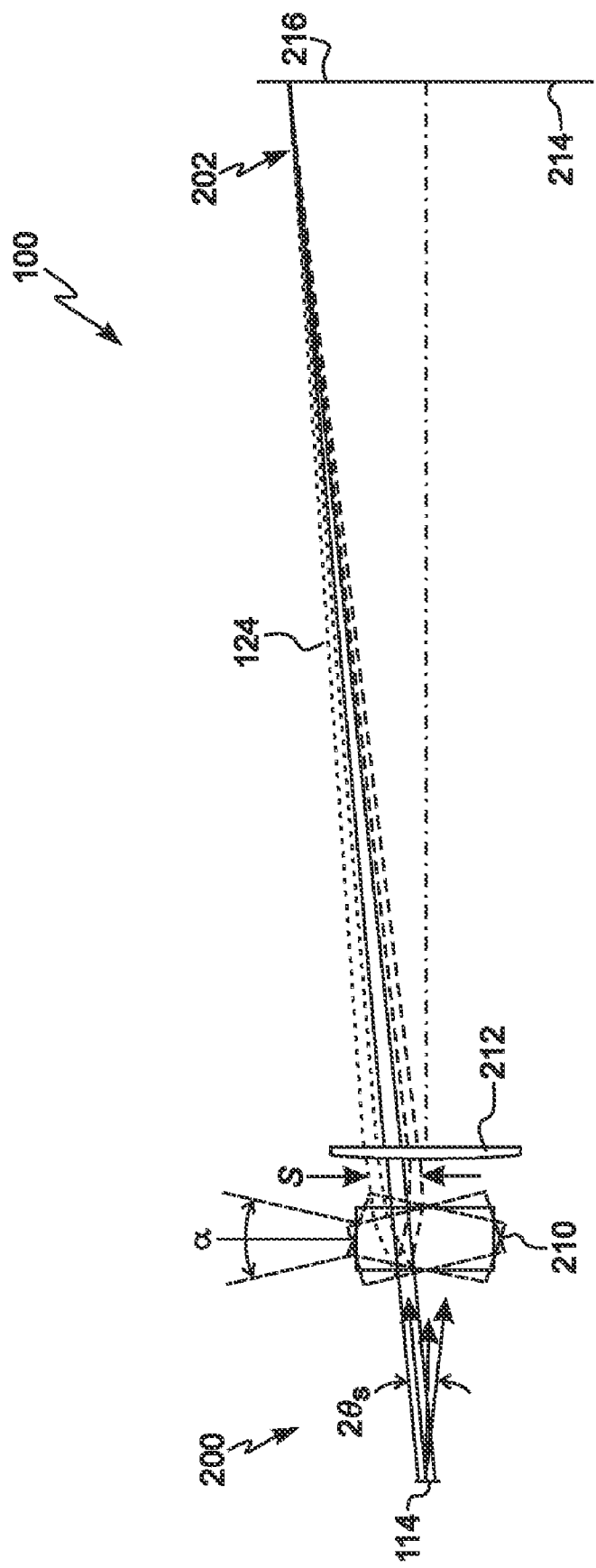
FIG. 2 is a diagram of a scanned laser display using a wobble plate to provide apparent speckle reduction via offset diversity in pupil space in accordance with one or more embodiments.

Referring now to FIG. 2, a diagram of a scanned laser display using a wobble plate to provide apparent speckle reduction via offset diversity in pupil space in accordance with one or more embodiments will be discussed. In one or more embodiments as discussed herein, instead of reducing speckle by manipulation in image space 202, as would be done by a manipulated element located at or near an image plane or image relay, speckle may be reduced via manipulation in pupil space 200, so as to maintain beam angle properties while purposely offsetting the beam 124 in x-y position and then converging the beam 124 at a distance on order of the screen distance. In so doing, a diffuser is no longer required, and instead non-scattering see-through optics may be utilized to achieve the effect of time-averaged speckle reduction.

As shown for example in FIG. 2, a rotating wobbling plate 210 may be mounted on a shaft of a motor with a fixed, converging lens 212 located just after the wobble plate 210 to converge the light to the projection screen 214. It should be noted that the term projection screen 214 may encompass any surface sufficiently suitable for having an image projected thereon by display 100, whether the projection screen 214 is a device specifically designed for such purpose such as a screen, or whether not specifically designed but otherwise suitable for such purpose such as a wall, a shirt worn by a person, fog or smoke, and so on, and the scope of the claimed subject matter is not limited in this respect. The optically clear, generally flat wobble plate 210 may have a tilted hole formed therein for mounting onto the motor shaft, causing the wobble plate 210 to wobble when the motor shaft is rotated so that the wobble plate 210 tilts about a vertical axis at a tilt angle, $\alpha$. In such an embodiment, the effective focal length of the converging lens 212 should be on the order of the distance from the converging lens 212 to the projection screen 214. A beam 124 of the scan is refracted within the wobble plate 210, and then rerefracted to its original angle out of the wobble plate 210, but with an offset, s. This offset beam is then directed to the same location 216 on the screen for all offset beam positions for a given spot location within a raster scan, thus maintaining full resolution capability of the MEMS scanning platform 114. For such wobbling plate type embodiments, a formula for the frequency of rotation of the wobble plate 210 may be as follows. It should be noted that these particular frequencies may result in a more pleasing appearance of the image, however they are not required to obtain speckle reduction, and other frequencies may likewise be utilized. In one or more embodiments, the frequency of rotation may be:

$$f = (k/N + n) * f_v$$

where:
  f is the rotational frequency in Hertz;
  N is the desired number of states or uncorrelated speckle patterns and N is an integer greater than one (N>1);

k is an integer ($k \in [1, N-1]$) and the value of k may be determined from the following statements:

k/N is a reduced fraction; or alternatively, k/N is in reduced form; or alternatively, the greatest common denominator between k and N is 1;

n is an integer; and $f_v$ is the vertical refresh frequency of the raster scan 126 in cycles per second or Hertz.

In the example shown in FIG. 2, wobble plate 210 may comprise an acrylic wheel of a selected thickness and/or diameter. In one test example, an acrylic wobble plate 210 having a seven inch diameter and a thickness of about 12 millimeters was utilized to demonstrate the ability to achieve some apparent reduction in speckle with a controlled limited loss of the depth of focus of the scanned laser display 100, thereby increasing the readability of text projected by the display 100. Thus, the concept of achieving apparent speckle reduction implemented in the example of FIG. 2 is capable of being implemented by one or more many tangible embodiments as shown in and described herein, and can be generically described as follows: A collimated beam is redirected angularly at a first plane, then redirected by a complementary opposed angle at a second plane in order to maintain angle property of the original beam. A parallel plate has the property that the angle of the output transmitted beam equals the angle of the input beam but from a position that has shifted due to the thickness, refractive index, and tilt of the plate. The beam is then further converged to a common location at a distance away from the second plane. However, it should be noted that the claimed subject matter is not limited in this respect.

In one or more embodiments, the beam 124 utilized by display 100 may be collimated, for example by using one or more lasers, however a collimated beam is not a requirement, and the scope of the claimed subject matter is not limited in this respect. In one or more embodiments wherein the beam 124 is a focused beam, in some cases a further converging effect may be combined with the redirection of the beam at a second plane to force convergence as performed by only two planes of interaction. For example, in one or more embodiments two scanning mirrors may be utilized in sync accepting the output scan 126 of the MEMS scanning platform 114 as an input and outputting the variable beam offsets over time, wherein the beams may then be forced to converge by the fixed converging lens 212. Note that with a focused beam passing through the MEMS scanning platform 114 instead of a collimated beam, it would be possible to achieve the same effect within a plane of incidence without requiring the converging lens 212 if the second synchronous scanner had a scan angle magnitude factor that compensated for the offset, thereby forcing the beam 124 to cross at the same location at a prescribed distance away toward and near the projection screen. Thus, one or more of the embodiments for achieving pupil space speckle reduction disclosed herein may create a time-varied beam offset with a pointing correction to allow overlap of all offset states for a given spot location at the screen, thereby achieving time-varied angle-diversity as seen by the screen without requiring the use of an intermediate image plane and/or without requiring the use of a relay of the source in image space, although the scope of the claimed subject matter is not limited in this respect.

In one or more embodiments, the concept of Beam Offset Diversity (BOD) disclosed herein may be utilized to provide despeckle glasses or eyewear. Speckle reduction may be obtained via time-varied manipulation of beam offsets near to the eye while maintaining angle information of light emanating from an object in conjunction with use of a lens having an effective focal length of approximately the distance of the eye to the object. In such embodiments, a user is capable of seeing straight through the despeckle optics toward the viewed object since no image space diffusers or scattering planes are utilized. Alternatively, instead of despeckle eyewear the despeckle concept may be utilized in the capturing of images from speckly objects in a lab environment wherein a time-averaging diffuser wheel and/or an intermediate image plane is not required. However, this is merely one example, and the scope of the claimed subject matter is not limited in this respect.

Figure 3A:
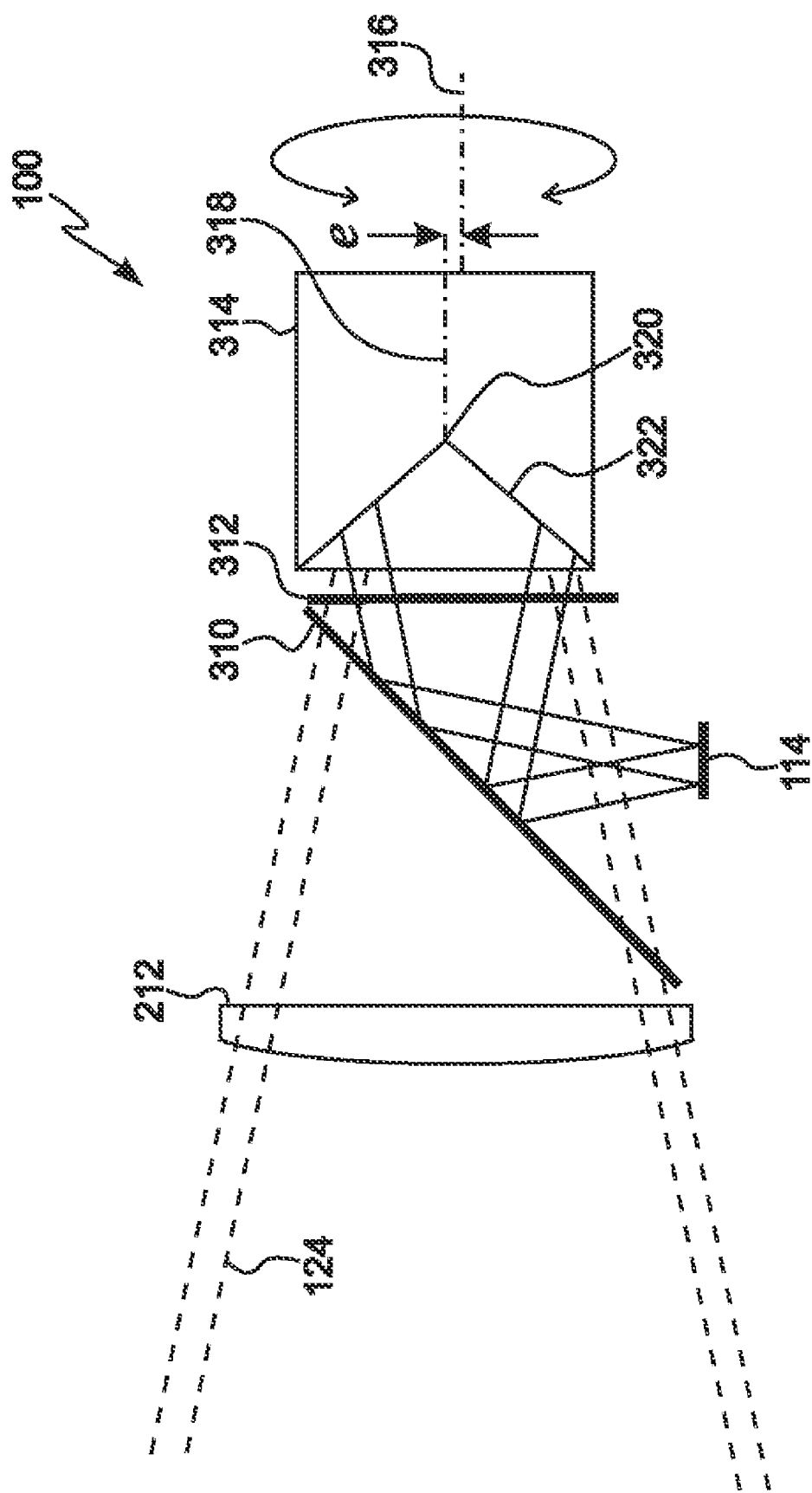
FIG. 3A is a diagram of a scanned laser display using a rotating retroreflector to provide apparent speckle reduction via offset diversity in pupil space in accordance with one or more embodiments.

Referring now to FIG. 3A, a diagram of a scanned laser display using a rotating retroreflector to provide apparent speckle reduction via offset diversity in pupil space in accordance with one or more embodiments will be discussed. In the embodiment shown in FIG. 3A, display 100 may include a polarizing beam splitter (PBS) 310 receiving the beam reflected from scanning platform 114 through retarder 312 and to retroreflector 314. Retroreflector 314 may be rotated about an axis 316 that is offset from its center axis 318 by a distance e as shown, referred to as an amount of axial decenter, in order to achieve beam offset diversity. As shown in FIG. 3A, retroreflector may comprise a cornercube 322 having an apex 320 of the cube generally located on the center axis 318 such that the apex 320 rotates about the rotational axis 316 during operation. The beam offset diversity is achieved via the axial decenter, e, of the rotating retroreflector 314. The resulting beam offset diversity may be defined as twice the axial decenter, e, between the rotational axis 316 and the central axis 318 corresponding to the corner cube apex 320. As retroreflector 314 is rotated during operation of display 100, the beam offsets will vary in time to result in an apparent speckle reduction in the image displayed by display 100. Although FIG. 3A shows a rotating corner cube 322 as an embodiment of retroreflector 314, other types of retroreflectors may also be utilized, and the scope of the claimed subject matter is not limited in this respect. For example, instead of a corner cube 322, retroreflector 314 may comprise an array of corner cubes, an array of high index balls or spheres, and/or a retroreflective dual microlens array (MLA) comprising two arrays of curved lens elements having a dissimilar pitch. A dual MLA array may be utilized, for example, to help limit geometrical shadowing that may occur with corner cubes, however the scope of the claimed subject matter is not limited in this respect. Telecentric correction of the light going into the retro-reflector array can also help reduce the effects of geometrical shadowing, and can be achieved by placing a telecentric correction lens just in front of the reflective array.

Figure 3B:
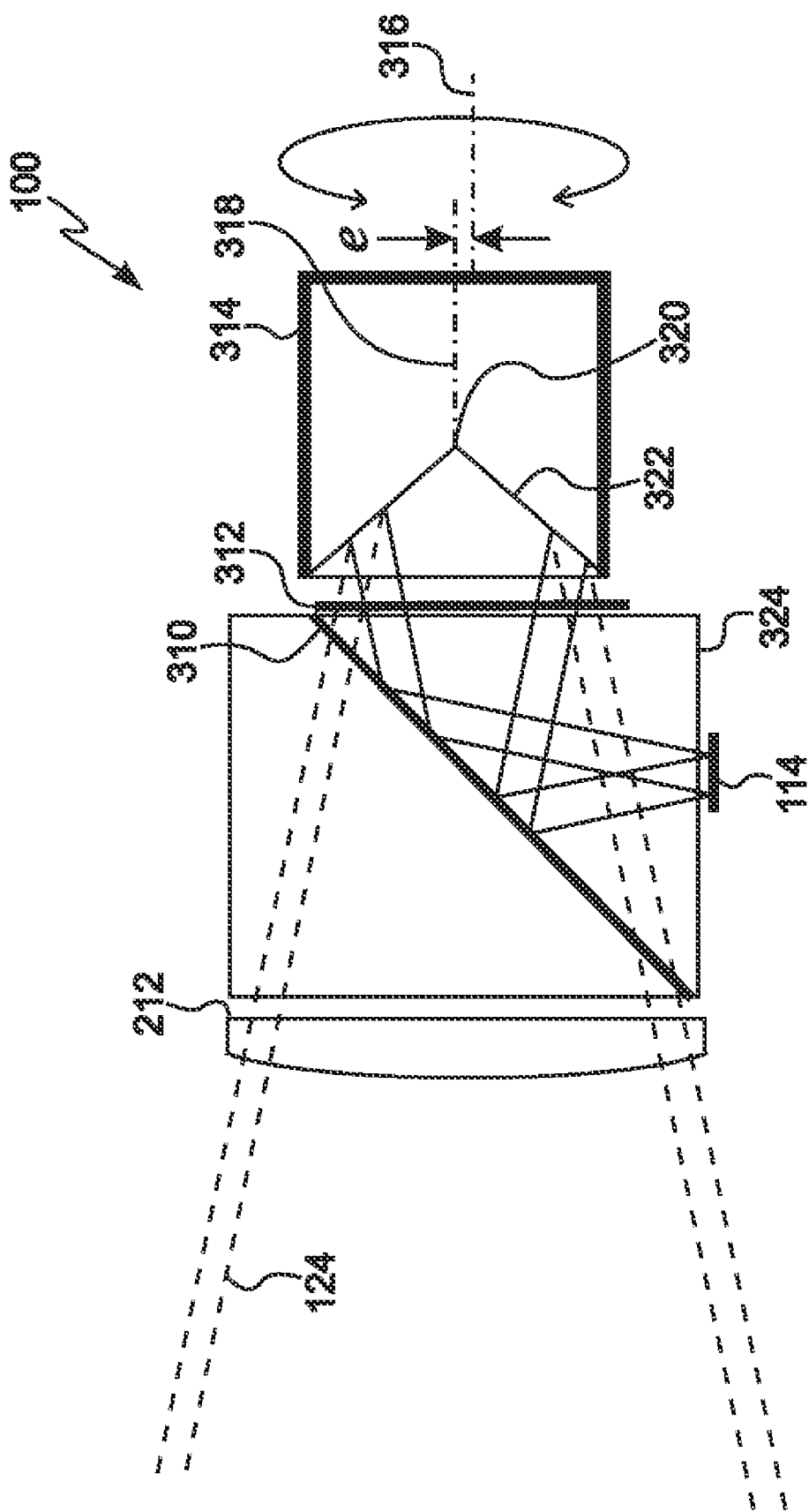
FIG. 3B is a diagram of a scanned laser display using a rotating retroreflector to provide apparent speckle reduction via offset diversity in pupil space in accordance with one or more embodiments.

Referring now to FIG. 3B, a diagram of a scanned laser display using a rotating retroreflector to provide apparent speckle reduction via offset diversity in pupil space in accordance with one or more embodiments will be discussed. The rotating retroreflector embodiment shown in FIG. 3B is substantially similar to the embodiment shown in and described with respect to FIG. 3A, including use of an eccentric offset e as shown in FIG. 3A. In one or more embodiments, FIG. 3B does not show an offset axis e, an in one or more particular embodiments the offset effect may created inherently by using an array with such an offset built into the array, above, except that the polarizing beam splitter 310 may comprise a solid optical medium 324 to help contain the angular spread and allow a reduced size of the components of display 100. Off-axis input may be utilized to allow beam input without creation of a hot spot due to a limited polarization extinction ratio. In some embodiments, using a retroreflector array for retroreflector 314, for example as discussed with respect to FIG. 3A above, may reduce the lens clear apterture requirement due to the effect of scan cone reconvergence. In addition, efficiency may be increased by using corner cube reflectors on both legs as desired, although the scope of the claimed subject matter is not limited in this respect.

Figure 4A:
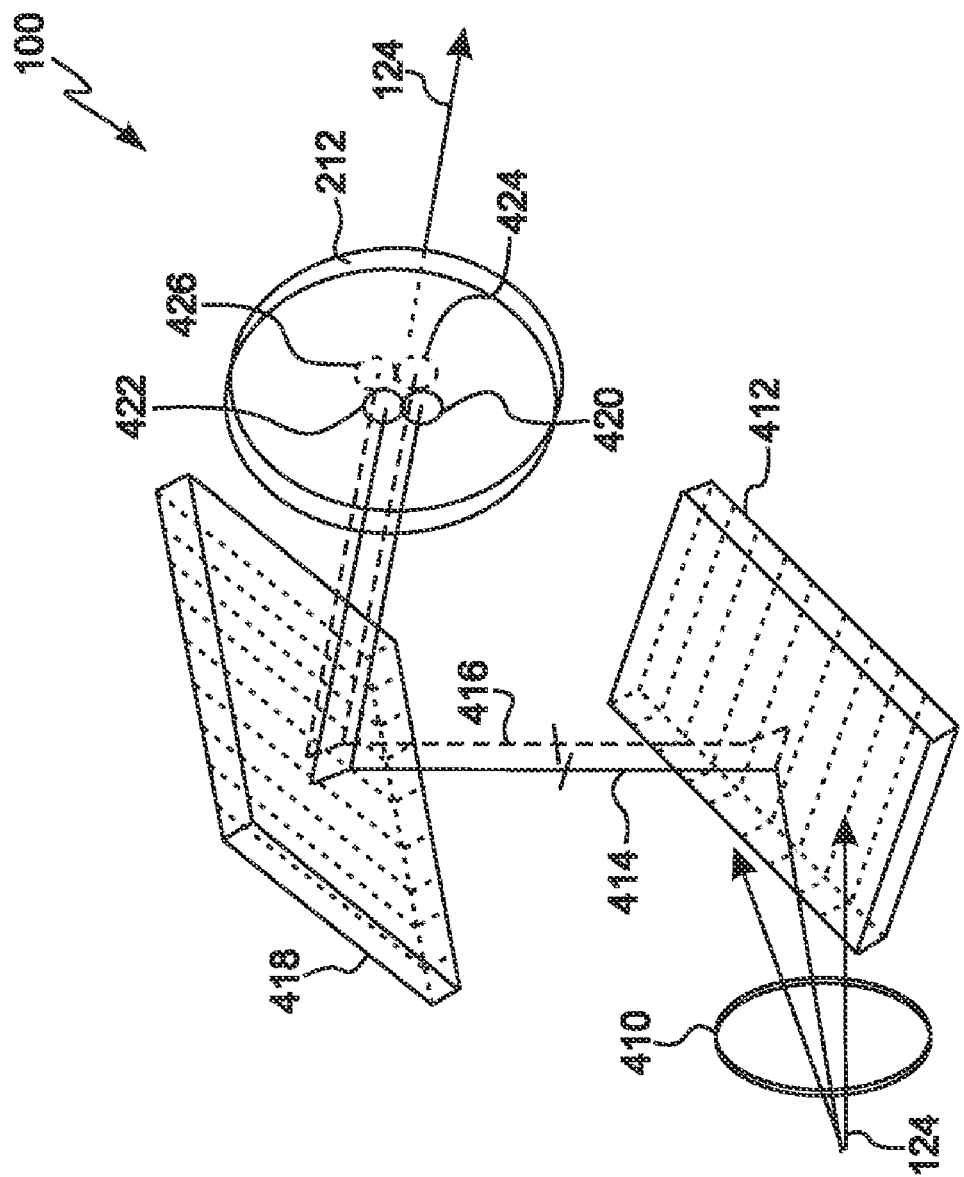
FIG. 4A is a scanned laser display using PBS plates to provide apparent speckle reduction via polarization induced offset diversity in pupil space in accordance with one or more embodiments.

Referring now to FIG. 4A, a scanned laser display using PBS plates to provide apparent speckle reduction via polarization induced offset diversity in pupil space in accordance with one or more embodiments will be discussed. In the embodiment shown in FIG. 4A, two stages of polarizing beam splitting is achieved by two polarizing beam splitters (PBS) 412 and 418. In one or more embodiments, the polarizing beam splitters 412 and/or 418 may comprise two PBS wiregrid array plates (as an example available from Moxtex, Inc., of Orem, Utah, USA as well as other suppliers), although the scope of the claimed subject matter is not limited in this respect. During operation of scanner 100, the beam 124 exits scanning platform 116 within scan cone 410 to impinge on the PBS 412. Via operation of PBS 412, components of beam 124 that are S-polarized are reflected off of the first surface (the PBS surface) of PBS 412, and components of beam 124 that are P-polarized are reflected of the second surface (the mirror surface) of PBS 412. The result is a beam offset between the reflected S-polarized beam 414 and the reflected P-polarized beam 416. Next, PBS 418 is oriented with respect to PBS 412 in such a way that an S-polarized input beam 414 induces one pair of offset beams having S and P components 420 and 422 at lens 212, and a P-polarized input induces another pair of offset beams having S and P components 424 and 426 at lens 212 as beam 124 exits display 100 toward a projection screen 214. In one or more embodiments, display 100 of FIG. 4A may include a polarization rotator such as shown in and described with respect to FIG. 8A and/or FIG. 8D, below to alternative between and ON state and an OFF state. In such embodiments, the polarization rotator may be positioned before PBS 418 an in particular may be disposed between light source 110 and scanning platform 114 in one or more embodiments, although the scope of the claimed subject matter is not limited in this respect. Even intensity between split and offset beams may be achieved via relative orientation the input beam polarization as well as the orientation of the k vector of the wiregrid arrays within the tilted reflector plane. Active rotation of the input beam polarization state due to utilization of a polarization rotator may enable the input beam intensity to be distributed into a first set of two of four states or a second set of two of four states, and/or evenly among all four states, depending on input polarization state, inducing offset diversity. Polarization states of the resulting offset beams may vary throughout switching of states in a known fashion, although in one or more embodiments the output states typically may be relatively orthogonal. For example, this may be achieved by orienting wiregrid k vector in first reflector plane to convert input linear into circular, then splitting circular into S+P, each having relative offsets upon reflection. In one or more embodiments the states are not required to be purely linear states, although in at least some embodiments the orientations should achieve relatively even intensities in the beams over states in order to provide optimal or nearly optimal results in speckle reduction via offset diversity in pupil space. Further details regarding polarization states are discussed with respect to FIG. 4B, 4C, and/or FIG. 4D, below.

Figure 4B:
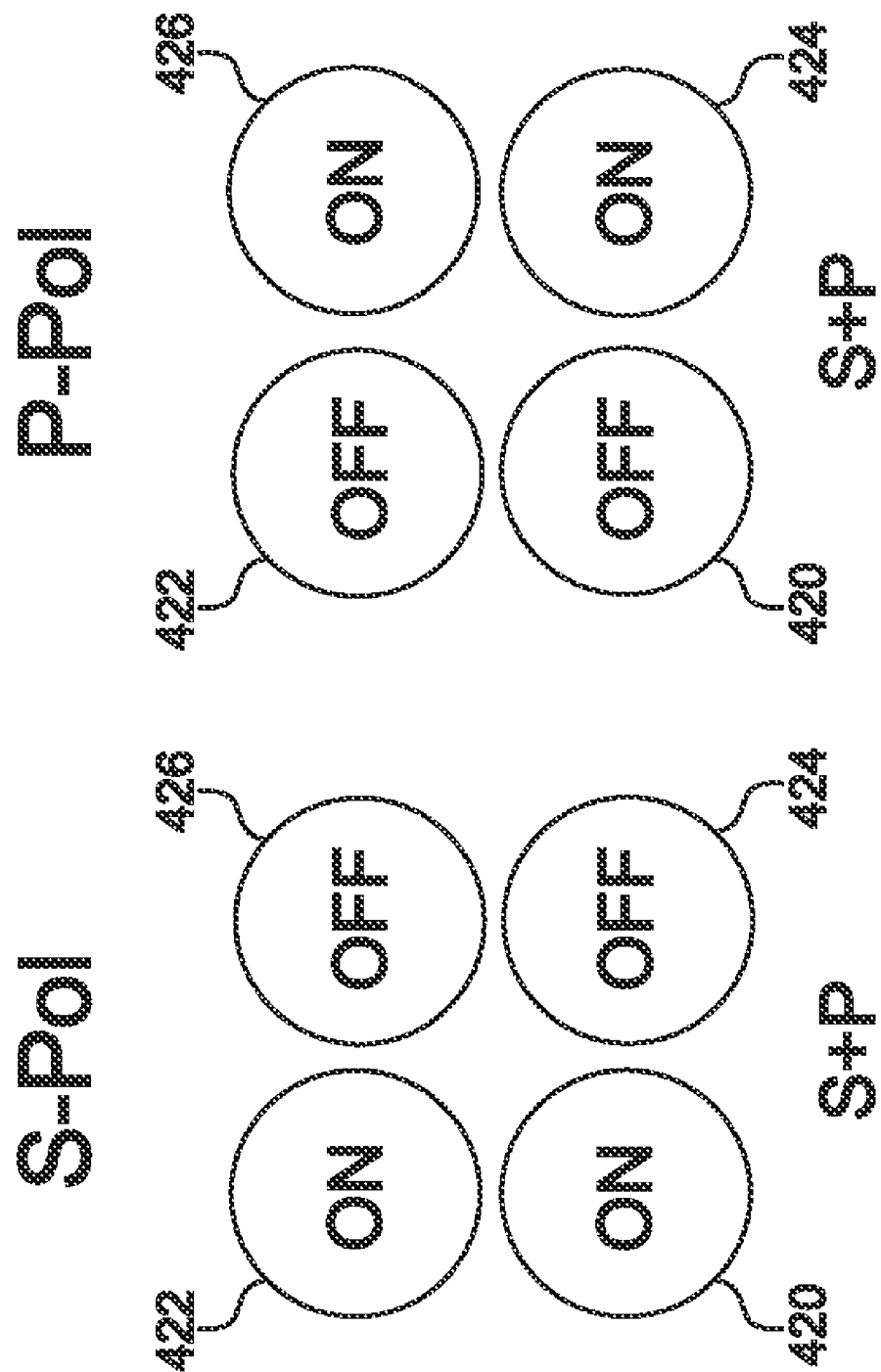
FIG. 4B is a diagram of polarization induced offset diversity in pupil space to achieve reduced apparent speckle in accordance with one or more embodiments.

Referring now to FIG. 4B, a diagram of polarization induced offset diversity in pupil space to achieve reduced apparent speckle in accordance with one or more embodiments will be discussed. FIG. 4B illustrates the multiple states of beam offset diversity as achieved by the two offset PBS plate embodiment as shown in and described with respect to FIG. 4A. The left hand side of FIG. 4B shows the beam states when the input to PBS plate 418 is the S-polarized beam 414 from PBS plate 412. The result is two offset beams 420 and 422 having S and P components that are in an ON state whereas beams 424 and 426 are in an OFF state. The right hand side of FIG. 4B shows the beam states when the input to PBS plate 418 is the P-polarized beam 416 from PBS 412. The result is two offset beams 426 and 424 that are in an ON state whereas beams 420 and 422 are in an OFF state. An alternative embodiment of the operation of polarization-induced beam offset diversity are shown in and described with respect to FIG. 4C and FIG. 4D, below.

Referring now to FIG. 4C, a scanned laser display using a PBS plate as shown in FIG. 4A showing an alternative embodiment thereof in accordance with one or more embodiments will be discussed. As shown in FIG. 4C, an incoming beam 124 may exit the scanning platform (not shown) where the polarization-induced beam offset diversity components are disposed post-scan to impinge polarizing beam splitter (PBS) 430. PBS 430 has an index of refraction value of n and a thickness of d as shown. When the incoming beam 124 exits the scanning platform, it may have various polarizations, for example beam 124 may be circularly right (CR) polarized, circularly left (CL) polarized, and/or linearly polarized at 45° for example. Input beam 124 impinges surface 432 of PBS 430 at an angle of θ with respect to normal such that half the energy of beam 124 is reflected off surface 432 as an S-polarized beam. The other half of beam 124 energy passes through surface 432 at an angle of θ' to be reflected off of mirrored back surface 434 as a P-polarized beam 438.

The P-polarized beam 438 exits surface 432 of PBS 430 such that the S-polarized beam 436 and the P-polarized beam 438 are offset by a distance of d'. The relationship between d and d' may be described as follows:

$d' = 2d*\tan(\theta')*\cos(\theta)$ with:

$n*\sin(\theta') = \sin(\theta)$

The two beams then pass through a polarization rotator 440 which is capable of rotating the polarization of the beams by 90°. As a result of operation of polarization rotator 440, in a first video frame 450, for example in every odd video frame, the first beam 442 exiting polarization rotator 440 may be S-polarized and the second beam 444 exiting polarization rotator 440 may be P-polarized. In a second video frame 452, for example every even video frame, the first beam 442 may be P-polarized and the second beam 444 may be S-polarized. In the event the polarization-induced beam offset diversity components are disposed pre-scan, then beams 442 and 444 may be reflected by scanning platform 114 wherein the slow scan axis 446 of scanning platform 114 may be disposed as shown in plan view in FIG. 4C. Beams 442 and 444 may then be directed through lens 212 to impinge display screen 214 wherein the beam offset diversity achieved by the components as shown in FIG. 4C may result in apparent speckle reduction in the image displayed on display screen 214. The beam offset diversity states achieved with the components of FIG. 4C are shown in and described with respect to FIG. 4D, below.

Referring now to FIG. 4D, a diagram of the beam polarization for alternating frames achieved by the scanned laser display of FIG. 4C in accordance with one or more embodiments will be discussed. As discussed with respect to FIG. 4C, above, the states resulting from polarization-induced beam offset diversity may be as follows. The beams are offset by a distance, d', and modulated in polarity with respect to the changing video frames displayed by display 100. For odd frames 450, first beam 442 may be S-polarized and second beam 444 may be P-polarized. For even frames 452, first beam 442 may be P-polarized and second beam 444 may be S-polarized. It should be noted that the examples shown in FIGS. 4A, 4B, 4C, and 4D are merely examples of how polarization and beam offset diversity may be achieved to provide varying states with respect to a video frame rate to achieve apparent speckle reduction, however other varying beam states and/or the number of states may be utilized with respect to a video frame rate to accomplish speckle reduction, and the scope of the claimed subject matter is not limited in these respects.

Figure 5A:
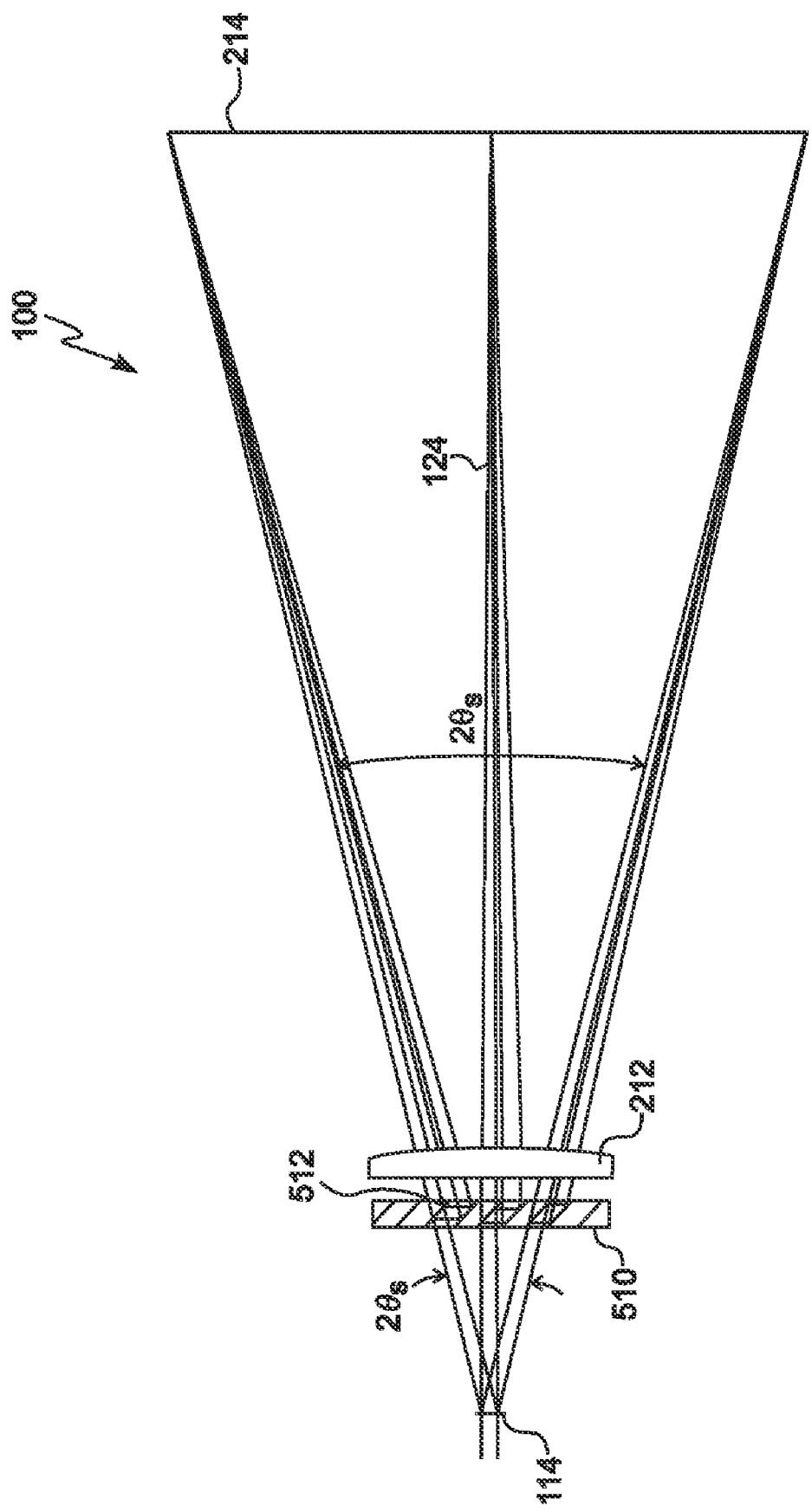
FIG. 5A is a diagram of a scanned laser display using a moving louvered array of partial mirrors to provide apparent speckle reduction via offset diversity in pupil space in accordance with one or more embodiments.

Referring now to FIG. 5A, a diagram of a scanned laser display using a moving louvered array of partial mirrors to provide apparent speckle reduction via offset diversity in pupil space in accordance with one or more embodiments will be discussed. In the embodiment shown in FIG. 5A, a moving louvered array 510 of partial mirrors 512 may be utilized to duplicate offset beams in a transmission mode via mirrors 512, and further the offset beam copies can be manipulated in position by moving the entire array 510 itself either in a linear and/or rotary fashion. Converging lens 212 may force the beams to converge at a distance effectively equal to the effective focal length (EFL) of the lens 212. In one or more embodiments, lens 212 may be referred to as a converging lens rather than a projection lens due to the fact that lens 212 may be lower in power, and/or may be made to exhibit minimal optical abberations in a simple fixed lens design such as a singlet.

Figure 5B:
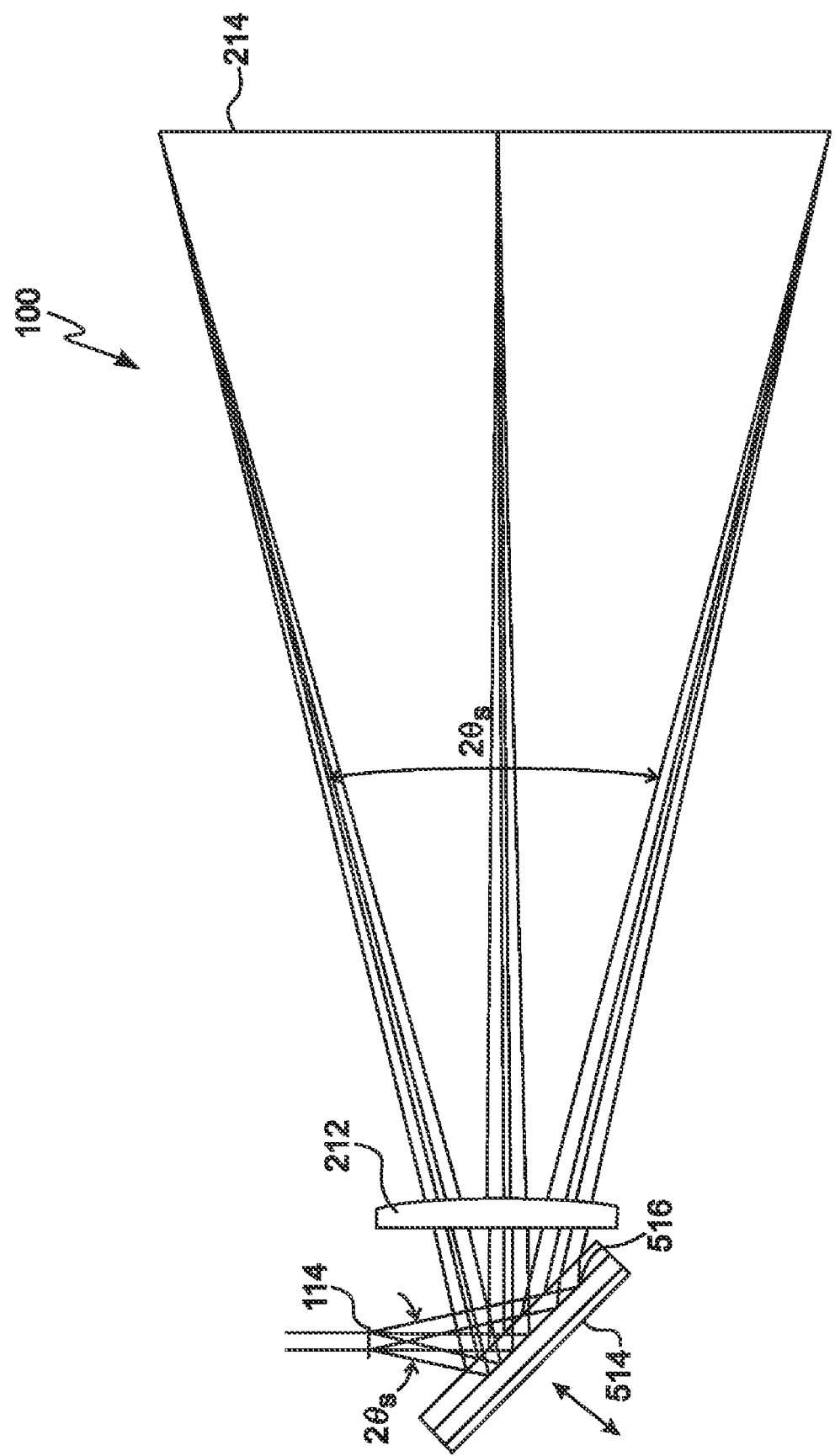
FIG. 5B is a diagram of a scanned laser display using a moving tilted mirror or moving tilted layered mirror to provide apparent speckle reduction via offset diversity in pupil space in accordance with one or more embodiments.

Referring now FIG. 5B, a diagram of a scanned laser display using a moving tilted mirror or moving tilted layered mirror to provide apparent speckle reduction via offset diversity in pupil space in accordance with one or more embodiments will be discussed. In the embodiment shown in FIG. 5B, a moving tilted mirror element 514, or alternatively a moving tilted layered mirror may incorporate a similar use of mirrors as shown in FIG. 5A wherein the mirrors 516 may comprise an active planar mirror element with partially-reflective coated layers. Manipulation of mirror element 514 causes the offset beam, or beams in the case of a multilayered mirror, to move in position while maintaining the same angular pointing of mirror element 514. Alternatively, mirror element 514 may be rotated in-plane off-axis or decentered as with the rotating retroreflector 314 of FIG. 3A, however the scope of the claimed subject matter is not limited in this respect.

Figure 6A:
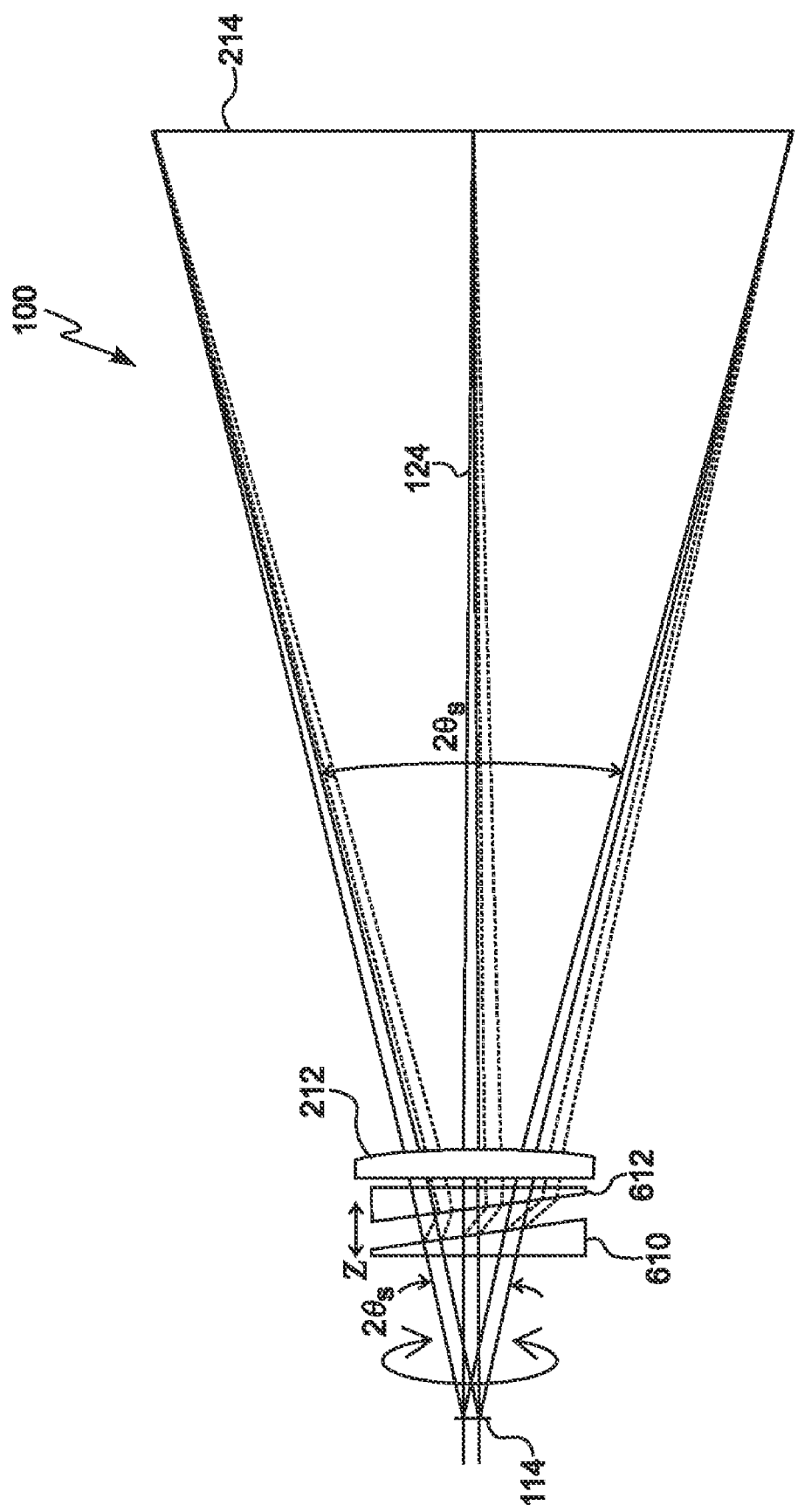
FIG. 6A is a diagram of a scanned laser display using rotary or linear manipulation of opposed wedges, an air gap, and/or a laminated or tiled sheet to provide apparent speckle reduction via offset diversity in pupil space in accordance with one or more embodiments.

Referring now to FIG. 6A, a diagram of a scanned laser display using rotary or linear manipulation of opposed wedges, an air gap, and/or a laminated or tiled sheet to provide apparent speckle reduction via offset diversity in pupil space in accordance with one or more embodiments will be discussed. In the embodiment shown in FIG. 6A, wedges 610 and 612 may comprise tilted sheets of optically transparent media arranged as shown to produce a fixed relative beam offset for a given index of refraction, thickness, and tilt angle. An effective flat and parallel sheet of air is formed between the two wedge prisms when the inner wedge surfaces are maintained parallel. When the sheet is tilted at different angles over time, or rotated with a given tilt angle with respect to the rotation axis, the beam 124 is offset over time. For the case of a plate rotating about an axis such that the plate surface normal is different than the rotation axis, the offset beam moves in a circular fashion over time of sheet rotation as with the wobble plate 210 example of FIG. 2. The resulting beam offset can be designed to create beam offset so as to form a synthetically expanded beam over time. This synthetic expansion can be constrained to limit loss of depth of focus for a given resolution, or alternatively maintain depth of focus while sacrificing a limited loss of resolution, either case for a given θ-D of scanning platform 114. Alternatively, the plate or wedges 610 and 612 may be manipulated to move in the z-direction as shown, and/or one or both wedges may be moved relative to the other in the x-direction and y-direction to achieve beam offset diversity.

Figure 6B:
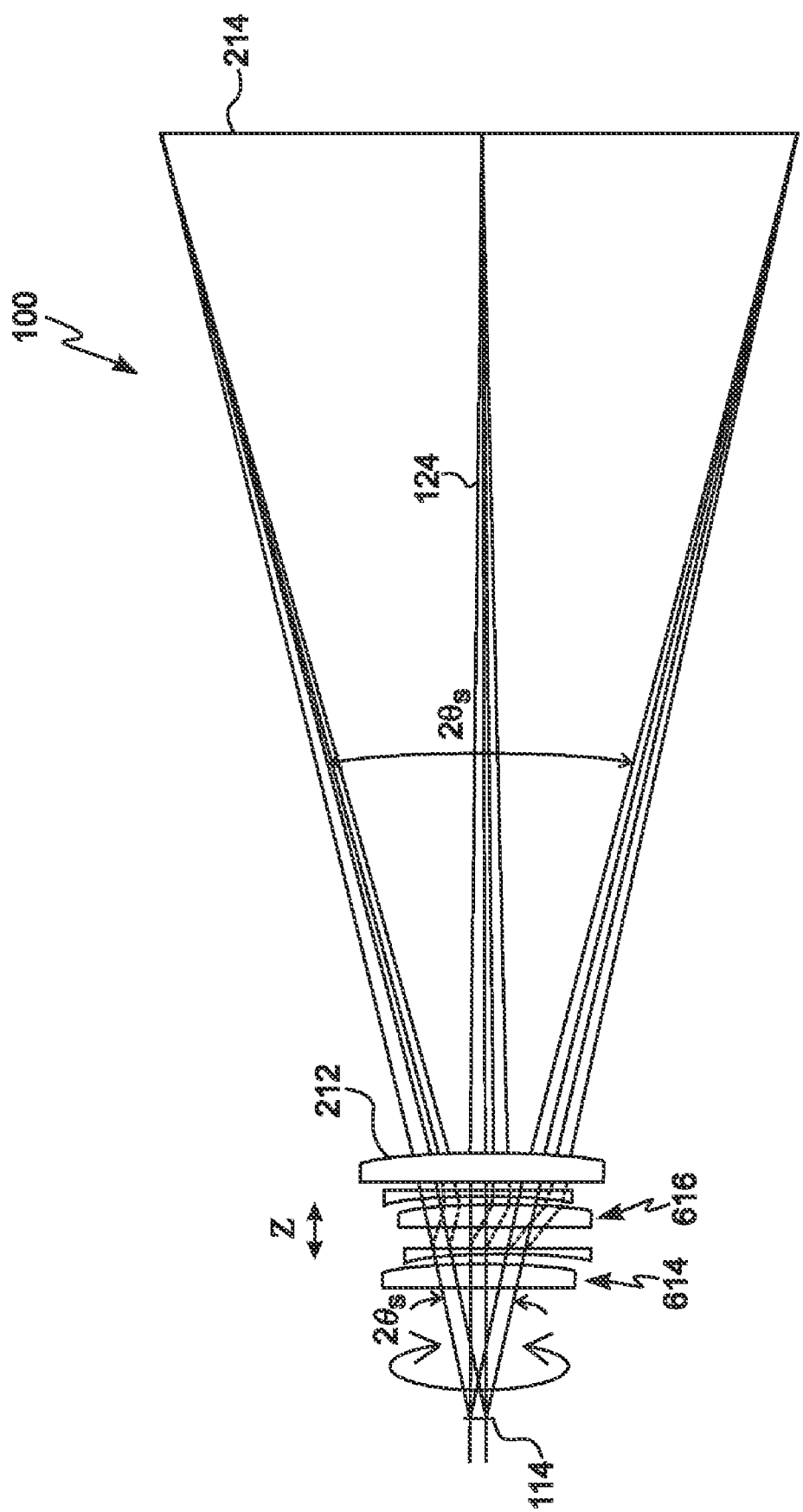
FIG. 6B is a diagram of a scanned laser display using an on-axis rotary lens group having two opposed lens sets to provide apparent speckle reduction via offset diversity in pupil space in accordance with one or more embodiments.

Referring now to FIG. 6B, a diagram of a scanned laser display using an on-axis rotary lens group having two opposed lens sets to provide apparent speckle reduction via offset diversity in pupil space in accordance with one or more embodiments will be discussed. Similar to the wedges 610 and 612 as shown in FIG. 6A, two opposed lens sets, comprising a first lens set 614 and a second lens set 616, may be utilized in an alternative embodiment to achieve a similar effect as a rotating tilted sheet. The lens sets 614 and 616 may have lens centers offset from a central axis and may rotate as a group, or alternatively can be laterally offset in the z-direction to shift the beam position over time by use of a linear actuator (not shown).

Figure 7A:
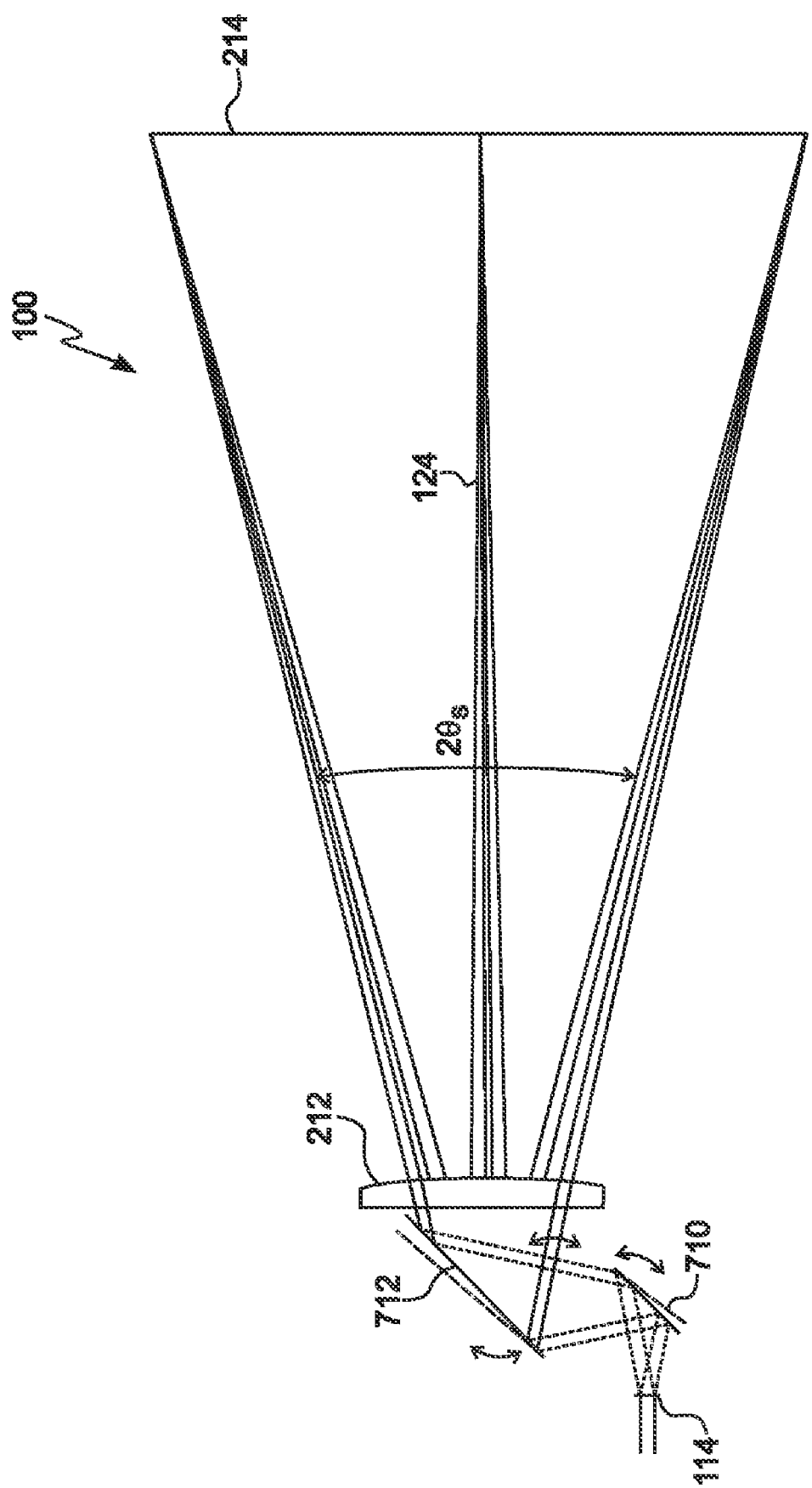
FIG. 7A is a diagram of a scanned laser display using synchronous rotating mirrors having two separate pivots or one group pivot to provide apparent speckle reduction via offset diversity in pupil space in accordance with one or more embodiments.

Referring now FIG. 7A, a diagram of a scanned laser display using synchronous rotating mirrors having two separate pivots or one group pivot to provide apparent speckle reduction via offset diversity in pupil space in accordance with one or more embodiments will be discussed. In the embodiment shown in FIG. 7A, a single stage of beam offset in one dimension may be achieved by two synchronously opposed rotating mirrors 710 and 712. Rotation of the mirrors 710 and 712 could be achieved via galvo mirrors, a MEMS based actuator, and/or another actuator. The first mirror 710 changes the input angle of the beam 124, while the second mirror 712 may have a complementary rotation angle to counter the angular shift, thereby bringing the output angle back to the same as the input angle while creating the desired offset of beam position in pupil space. A converging lens 212 may be disposed in the beam path after mirrors 710 and 712 to converge all offset beams at the projection screen 214. Mirrors 710 and 712 may be disposed after the scanning platform 114 or alternatively disposed before the scanning platform. In one particular embodiment, a one-dimensional (1D) utilization of beam offset diversity could be implemented prior to scanning platform by extending the scanning platform only along one dimension, for example the vertical slower scan dimension as opposed to extension along the horizontal faster dimension, although the scope of the claimed subject matter is not limited in this respect.

Figure 7B:
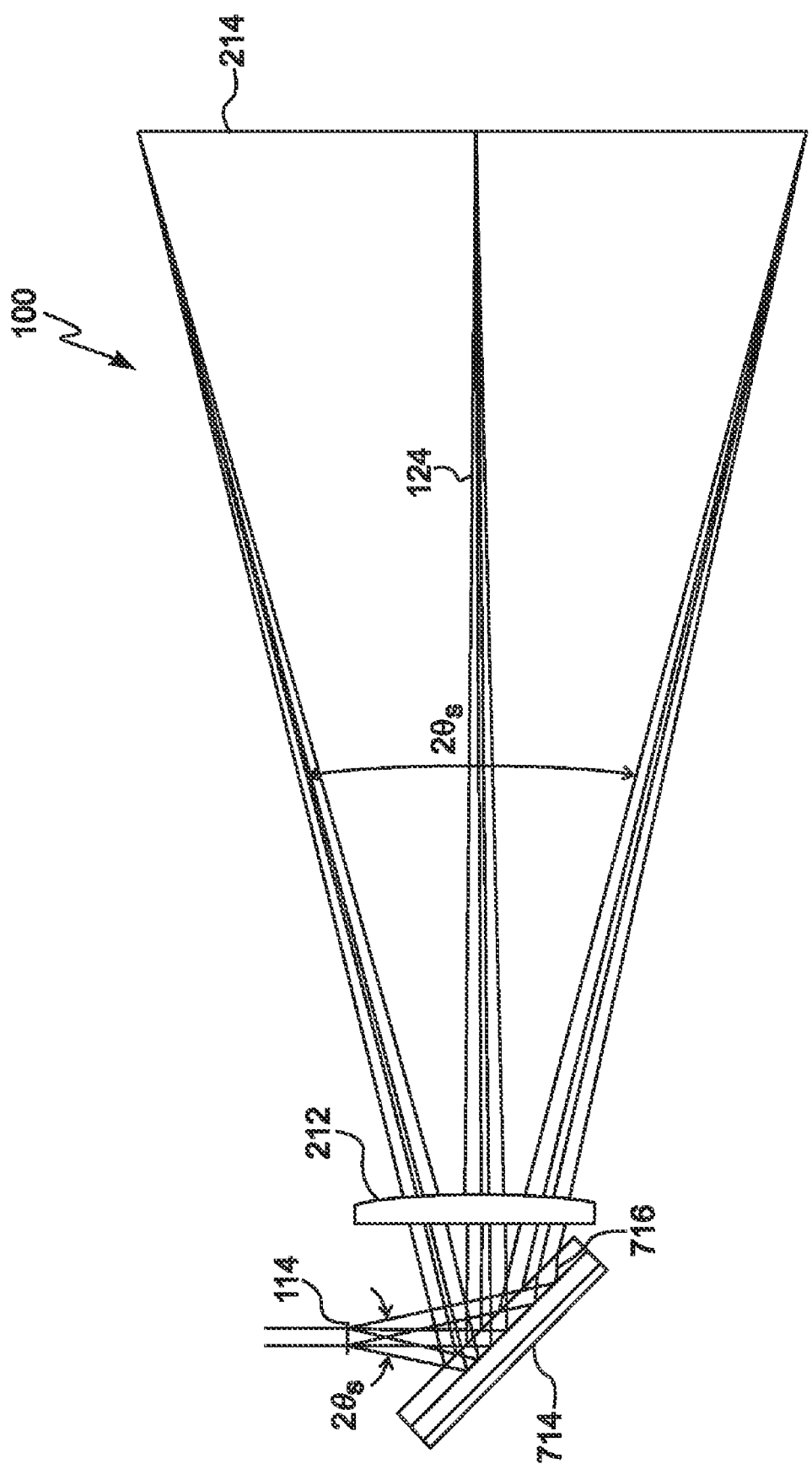
FIG. 7B is a diagram of a scanned laser display using reflectance induced beam position switching using an electrical high-reflectance/low-reflectance layered mirror to provide apparent speckle reduction via offset diversity in pupil space in accordance with one or more embodiments.

Referring now to FIG. 7B, a diagram of a scanned laser display using reflectance induced beam position switching using an electrical high-reflectance/low-reflectance layered mirror to provide apparent speckle reduction via offset diversity in pupil space in accordance with one or more embodiments will be discussed. In the embodiment shown in FIG. 7B, mirror element 714 may comprise a mirror layer 716 that is capable of being electrically switched from higher reflectance to lower reflectance at sufficiently fast frequency. The mirror layer 716 may comprise a layered switching mirror laminated on a front surface of mirror element to achieve beam offset diversity over time as mirror layer is switched between higher reflectance and lower reflectance. Mirror layer 716 may comprise an electrochromic mirror having a sufficient switching frequency to achieve beam offset diversity at the frame rates utilized by display 100.

Figure 8A:
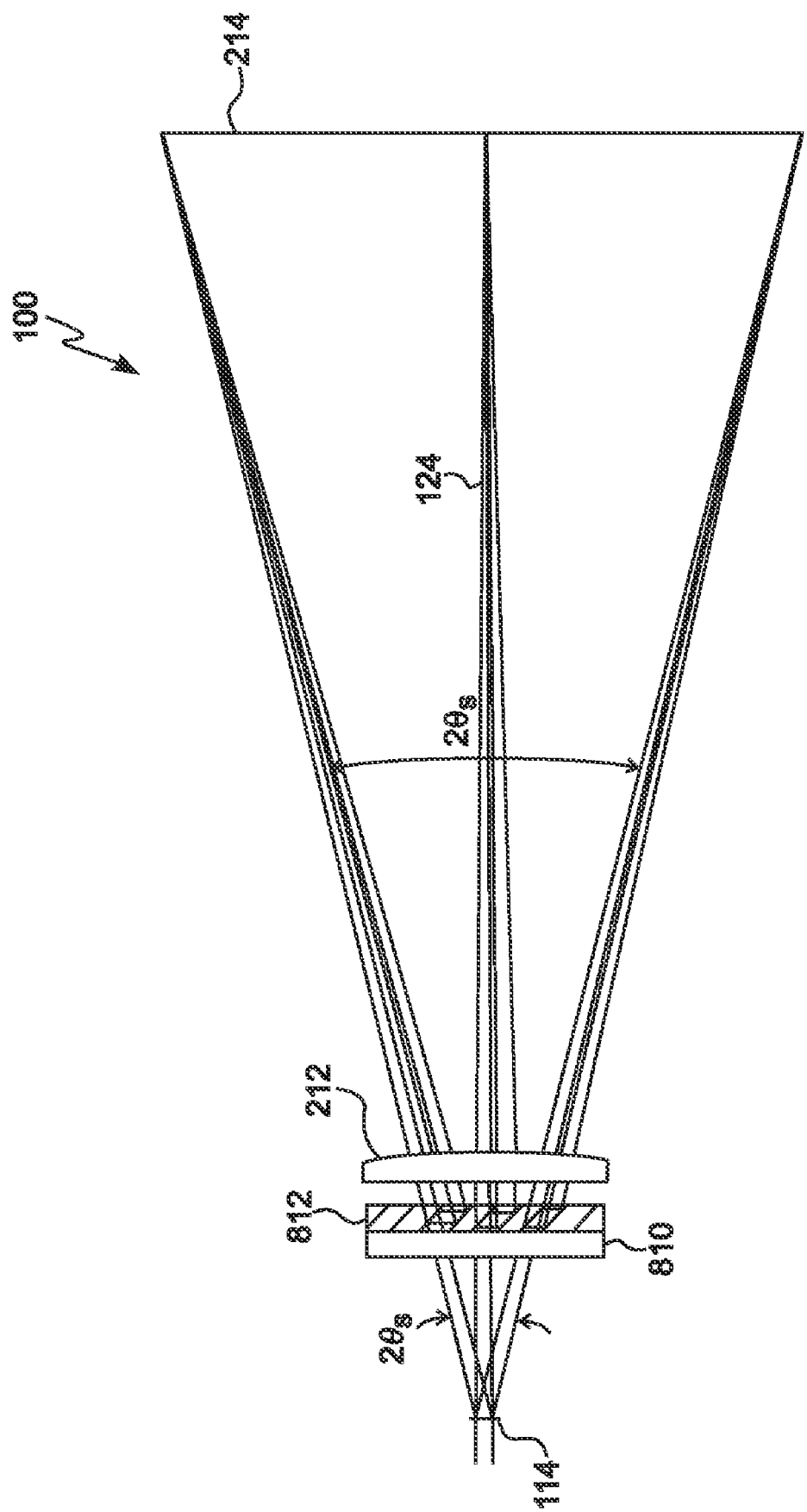
FIG. 8A is a diagram of a scanned laser display using polarization induced offset diversity via a plate array of polarization sensitive louvered mirrors to provide apparent speckle reduction via offset diversity in pupil space in accordance with one or more embodiments.

Referring now to FIG. 8A, a diagram of a scanned laser display using polarization induced offset diversity via a plate array of polarization sensitive louvered mirrors to provide apparent speckle reduction via offset diversity in pupil space in accordance with one or more embodiments will be discussed. In the embodiment shown in FIG. 8A, beam offset diversity may be achieved via a polarization rotator 810 comprising a polarization rotating active device having polarization sensitive coating on an array of louvers 812. By utilizing such a polarization rotator having an array of louvered polarizing beam splitter (PBS) mirrored louvers 812, for example in alternating in orientation for every other louver with a retarder between each louver, beam 124 is capable of being switched between alternate positions. The array of louvers 812 may be similar to similar arrays used in projectors to reclaim more efficiency by rotating the undesired polarization. In the present embodiment case, array of louvers 812 may be utilized for switching beam position, with a retarder disposed between adjacent louvers. Such an arrangement may be utilized when the polarization of both offset beam copies is desired to be of the same polarization state upon exiting the polarization rotator 810; however using a retarder between adjacent louvers is not required. In one or more embodiments, polarization rotator 810 may be simplified wherein the louvers of the array of louvers 812 have the same PBS orientation, for example such that a P-polarized beam is transmitted while an S-polarized beam is reflected by an embedded louver and then re-reflected by another adjacent louvre mirror, exiting the polarization rotator 810 and then passing through a converging lens 812 for maintaining convergence of the exiting beams over time at the projection screen 214.

Figure 8B:
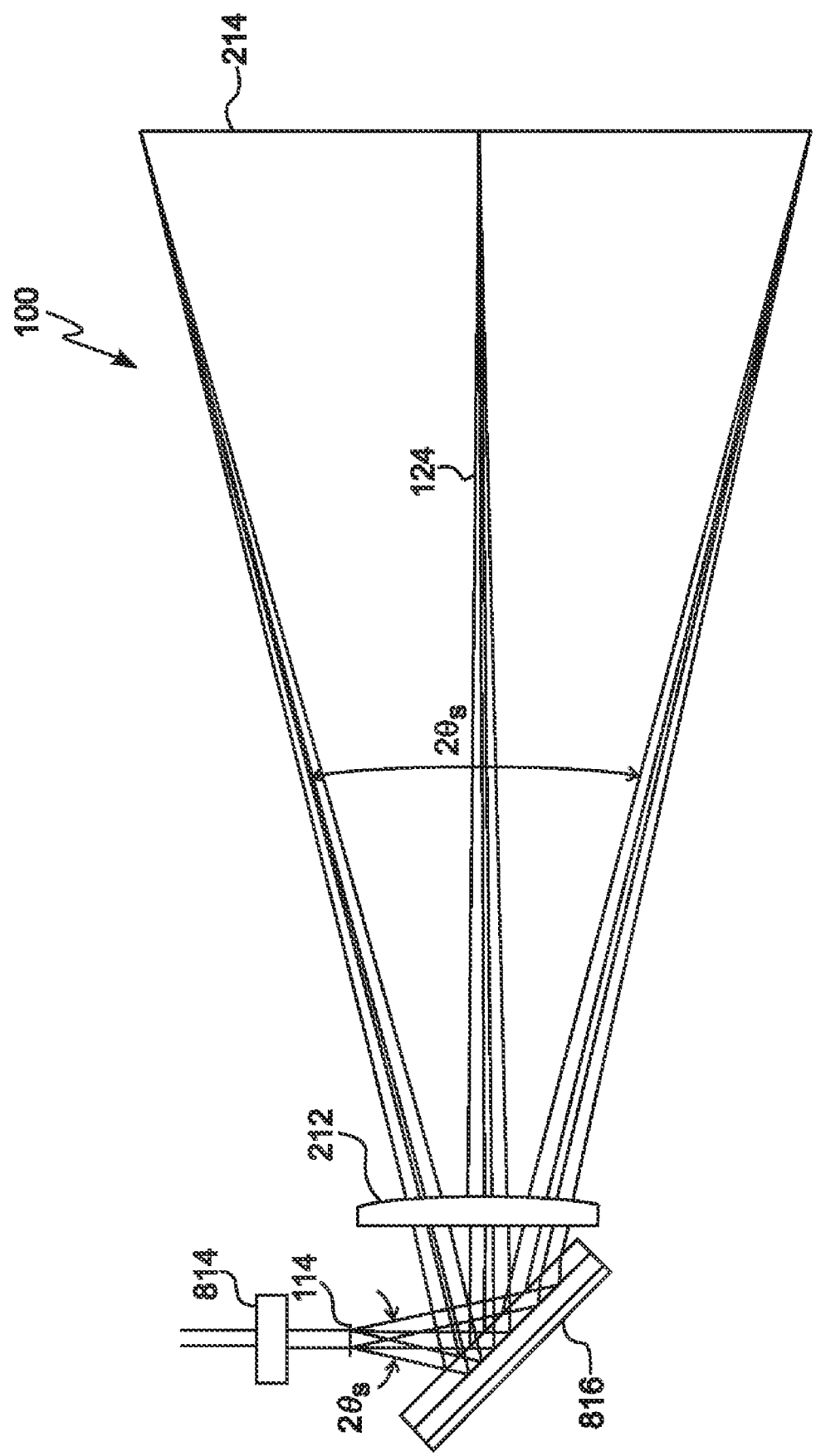
FIG. 8B is a diagram of a scanned laser display using polarization induced beam position switching via a polarization sensitive fixed tilted layered mirror to provide apparent speckle reduction via offset diversity in pupil space in accordance with one or more embodiments.

Referring now to FIG. 8B, a diagram of a scanned laser display using polarization induced beam position switching via a polarization sensitive fixed tilted layered mirror to provide apparent speckle reduction via offset diversity in pupil space in accordance with one or more embodiments will be discussed. The embodiment shown in FIG. 8B may comprise a reflective version of the transmissive version of polarization-induced beam offset diversity as shown in and described with respect to FIG. 8A, above. Further, the embodiment shown in FIG. 8B is substantially similar to the embodiment shown in FIG. 4C but with an electrically active polarization rotator 814 being disposed prior to the scanning platform 114 and with PBS 816 disposed after the scanning platform 114. Each stage may be capable of creating a beam offset upon switching or rotating the input polarization state of the input beam 124, for example via utilization of a retarding, polarization rotating, device such as a Ferro-electric Liquid Crystal (FLC) device so as to achieve two distinct beam positions per stage, with each position being addressed by a distinct input polarization state. It should be noted that by making use of a second stage orthogonally set with respect to the first stage, four uncorrelated states may be formed over two consecutive frames. In some embodiments, a quarter-wave retarder may be disposed between stages to achieve beams that are relative offset and containing simultaneous S-polarization and P-polarization components for a given input beam polarization state. In this case, both PBS orientations are orthogonal to the reflection plane. However, the same effect can be achieved without a retarder plate between stages by simply rotating the PBS orientation within its own mirror plane so as to allow partial passage of both S-polarized and P-polarized components to be distributed to two beams offset positions. In this respect, two offset beams having orthogonal polarization states which will not interfere may be illuminated for each input polarization state defined by the polarization rotator 814. Thus, one pair of orthogonal S-polarized, P-polarized offset beams may be illuminated during one frame, and a different uncorrelated pair of S-polarized, P-polarized offset beams may be illuminated during the next frame to achieve four uncorrelated states every two frames. As a result, speckle in the image projected at projection screen 214 may mitigate speckle regardless since there will be an offset in pupil space that is mapped to the two orthogonal polarization states which do not interfere to provide an extra uncorrelated state. Such an arrangement may also be extended to include polarization-induced spatial multiplexing, although the scope of the claimed subject matter is not limited in this respect.

Figure 8C:
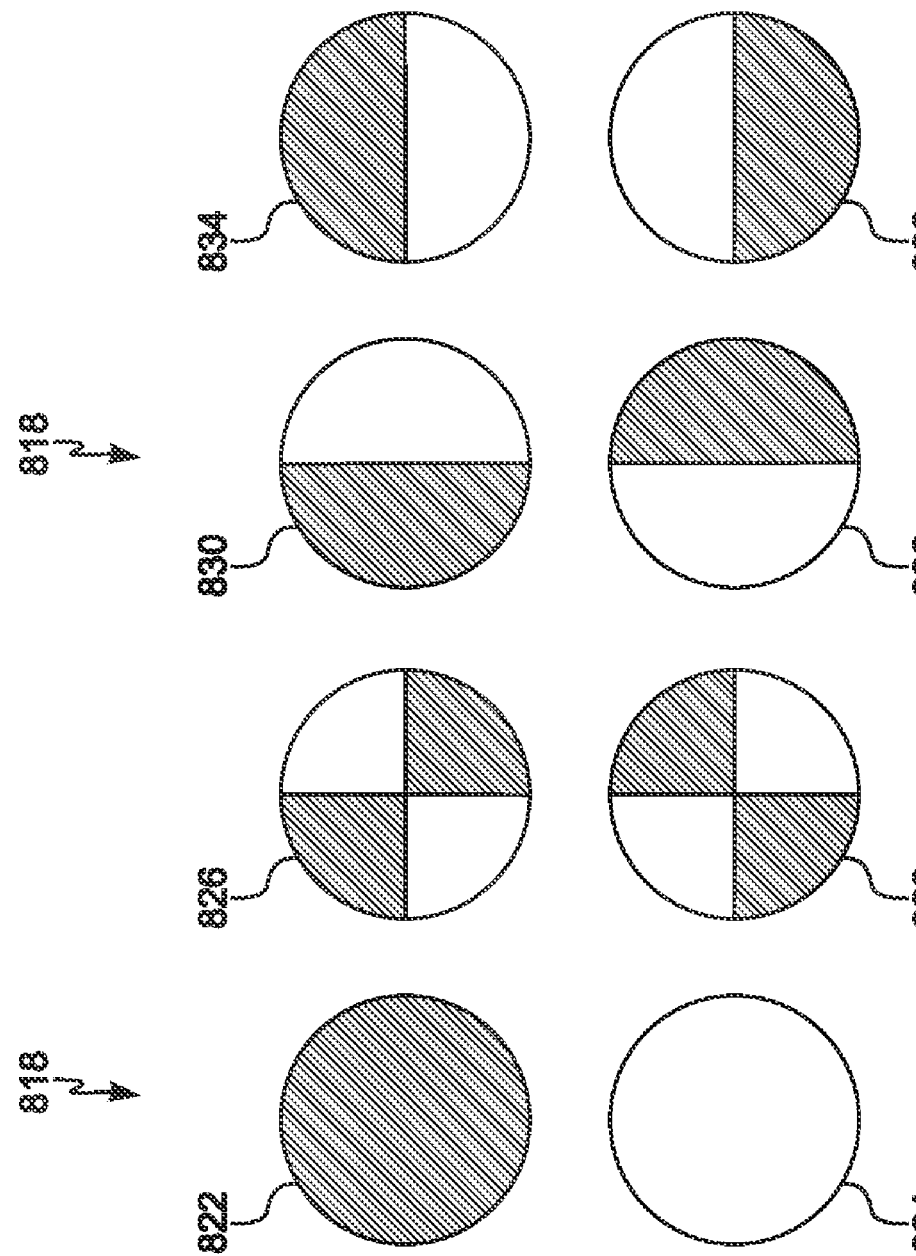
FIG. 8C is a diagram illustrating polarization induced beam offset states and additional spatial polarization multiplexed states achieved via the scanned laser display as shown in FIG. 8A and/or FIG. 8B in accordance with one or more embodiments.

Referring now to FIG. 8C, a diagram illustrating polarization induced beam offset states and additional spatial states achieved via the scanned laser display as shown in FIG. 8A and/or FIG. 8B in accordance with one or more embodiments will be discussed. In one embodiment, two polarization-induced beam offset states may be achieved with a first offset beam having a first polarization state 822 and a second offset beam having a second polarization state 824. In one or more other embodiments, additional spatial states may be achieved via spatial diversity of polarization wherein in a showing various combinations of polarization and position states at state 826, state 828, stated 830, state 832, state 834 and state 836. In this diagram, four example cases are shown left to right. In each case, the top and bottom circles represent two beams separated by polarization induced offset diversity. The white potions of the circles indicate where there is light at a given time $t_1$. Note that the top and bottom circles together always add up to a single, full beam, so no brightness is lost. In the particular embodiment shown, the beam area may comprise a circle such that the beams shapes are circular broken up into semicircles and quadrants. The embodiment shown in FIG. 8C illustrates that a pixelated polarization rotator would make some portions S-polarized and the rest P-polarized. Then the polarization-switched offset device would displace the different polarizations, shown in FIG. 8C as a vertical displacement, that is top and bottom of the beam. At a later time, $t_2$, for example on the next video frame, the polarizations would be reversed, thereby exchanging the positions of the top and bottom beams. By changing the pixel patterns, multiple pairs of polarization-switched offset beams could be achieved, with each pair causing a different speckle pattern, thereby giving multiple speckle patterns that could be averaged to reduce the perceived speckle. Such sub-beam pixelated techniques could be used with any of the polarization-switched offset diversity methods described herein. However, these are merely examples of polarization-induced beam offset diversity states, and the scope of the claimed subject matter is not limited in these respects.

Figure 8D:
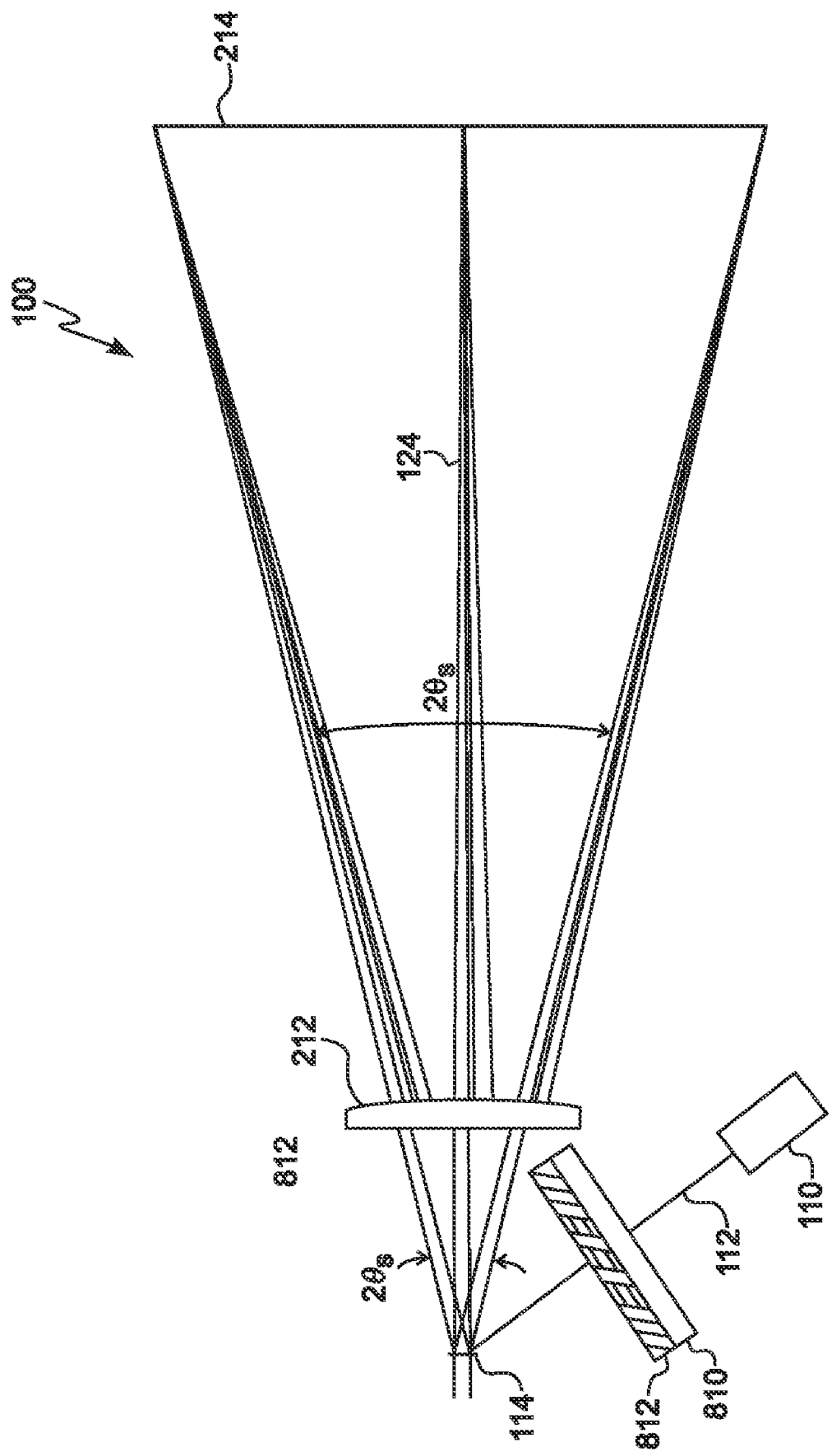
FIG. 8D is a diagram of a scanned laser display using polarization induced offset diversity via a plate array of polarization sensitive louvered mirrors in an alternative location to provide apparent speckle reduction via offset diversity in pupil space in accordance with one or more embodiments.

Referring now to FIG. 8D, a diagram of a scanned laser display using polarization induced offset diversity via a plate array of polarization sensitive louvered mirrors in an alternative location to provide apparent speckle reduction via offset diversity in pupil space in accordance with one or more embodiments will be discussed. The embodiment shown in FIG. 8D is substantially similar to the embodiment shown in FIG. 8A except that the plate array of polarization sensitive louvered mirrors is disposed prior to the scanning platform 114 between light source 110 and scanning platform.

Referring now to FIG. 9A, a diagram of a scanned laser display using opposed spatial light modulators disposed at a separation distance to provide apparent speckle reduction via offset diversity in pupil space in accordance with one or more embodiments will be discussed. In the embodiment shown in FIG. 9A, two opposed spatial light modulators (SLMs) 910 and 912 are disposed apart at a selected separation distance to function in a manner substantially similar to the opposing wedges 610 and 612 of FIG. 6A. Spatial light modulators 910 and 912 may comprise a lithographed matrix array device having the capability to change relative phase of any of the cells within the device to create wavefront phase profile changes, thereby resulting in angular effects on the input beam. In embodiment, a beam may be angularly redirected by a first phase SLM 910 acting as an electrically induced variable optical wedge, and then angularly corrected back on course by a second phase SLM 912 serving as a complementary optical wedge to redirect the beam to match to the original input angle. As a result a beam offset diversity effect is produced. In embodiments wherein one or more of SLM 910 and/or SLM 912 are disposed prior to the scanning platform 114, such an arrangement of the SLM the devices may be utilized to implement a variable beam expander, and/or an original beam to conic-effected annular ring. An example of a variable beam expander is shown in and described with respect to FIG. 9D, below. In such an arrangement, the two SLMs 910 and 912 may form an SLM stack to implement two opposing diffractive lenses as a variable beam expander, or dot, to an enlarged annular ring. In this embodiment, the beam energy is shifted into different, somewhat non-overlapping regions for achieving uncorrelated speckle states. The variable beam expander embodiment may be analogous to alternatively using two opposing adaptive lenses as a variable beam expander or variable magnification telescope. Two planes of adaptive optic devices, such as two adaptive lenses, may also produce changes in beam position content or layout via electrically activated states, whether analog or digital. In one or more embodiments, SLM 910 and SLM 912 may comprise an optical pair of electrically addressable wedges realized via standard image stabilizers such as those often used in cameras such as video cameras and/or still shot cameras where the stabilizers exhibit a sufficient frequency response. Spatial light modulators and image stabilizers are able to maintain the resolution capability of the scanning platform when utilized after the scanning platform 114 while achieving the desired beam offset diversity effect. In some embodiments, piezo actuators may be lithographed to create suitable phase spatial light modulators, for example using three flat bonded mirrors, two of which being bonded to 2 two piezo stacks and one to a fixed block. However, these are merely examples of how spatial light modulators or similar devices may be utilized to provide beam offset diversity to achieve speckle reduction, and the scope of the claimed subject matter is not limited in this respect.

Figure 9B:
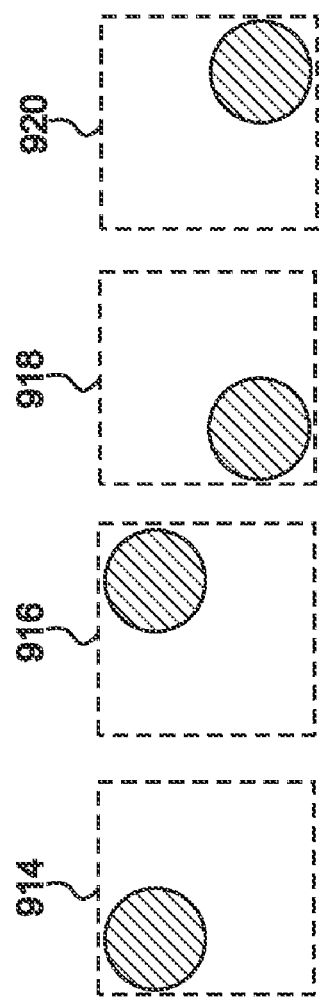

Referring now to FIG. 9B, a diagram of the beam spots of the MEMS based display of FIG. 9A showing a four state time series for 2D wedges in accordance with one or more embodiments will be discussed. In such embodiments, four states of beam positioning may be achieved as shown at state 914, state 916, state 918, and state 920.

Figure 9C:
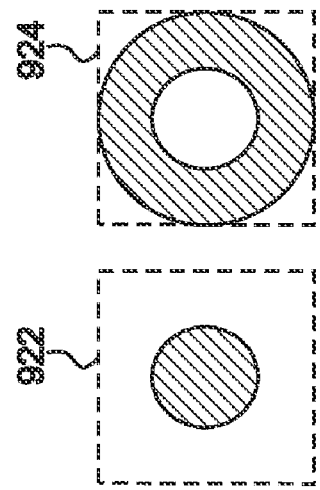

Referring now to FIG. 9C, a diagram of the beam spots of the scanned laser display of FIG. 9A showing a two state time series for 2D conics in accordance with one or more embodiments will be discussed. In such embodiments, beam positioning may be achieved as shown at state 922 and state 924.

Referring now to FIG. 9D, a diagram of a variable beam expander of a scanned laser display to vary the beam output size over time to provide apparent speckle reduction via offset diversity in pupil space in accordance with one or more embodiments will be discussed. In such embodiments, two lens elements 926 and 928 may be utilized to increase the separation distance between two input beams 930 and 932 to two expanded corresponding output beams 934 and 936. By modulating the amount of beam expansion, beam offset diversity may be achieved to result in speckle reduction.

Referring now to FIG. 10, a diagram of a scanned laser display using electrical beam position switching using a frustrated total internal reflection (TIR) element to provide apparent speckle reduction via offset diversity in pupil space in accordance with one or more embodiments will be discussed. In the embodiment shown in FIG. 10, electrical beam position switching may be achieved via a frustrated total internal reflector (TIR) 1010. Such an embodiment may be utilized to achieve beam offset diversity at a stage to multi-stage level, within the limits of being able to fit the full angular cone of the raster 126 into and through the frustrated TIR 1010. Evanescent coupling may be utilized to couple the beam to the second surface when the two media are pulled in contact with each other via a piezo actuator while the beam is reflected by the TIR 1010 when the secondary media interface is separated beyond contact or touching.

One or more of the above discussed embodiments to obtain beam offset diversity may be implemented at sub-pixel frequencies in order to optimize or nearly optimize the effect of speckle reduction. Furthermore, other similar devices may be implemented to similarly achieve beam offset diversity, for example via moldable devices that are capable of operating at ultra fast speeds such as polymer devices that utilize electro-optic (EO) inks and/or dyes in polymers. One or more of the embodiments for beam offset diversity may be designed to achieve the most or nearly the most uncorrelated states in the least or nearly the least number of consecutive frames. To achieve about 50% reduction in apparent speckle, four states may utilized. Multiple combinations and/or stages of the disclosed embodiments, above, be utilized to achieve further speckle contrast mitigation at selected tradeoff with depth of focus of the display 100. In one or more embodiments, such a tradeoff may be made in design by one of the following. In one such embodiment, the beam offset diversity effect may be turned on or off in a switchable switchable form wherein a full depth of field (DOF) may be achieved in an off state but with speckle, or the beam offset diversity effect may be provided in an on state with mitigated speckle and a reduced DOF. Alternatively, a polarization switching capability may be integrated into the scanned beam display 100, with the polarization switching component may be integrated with a display 100 as a passive optic add on or flip in place component or alternatively electrically and/or manually switched in place. In such an embodiment, when using an add-on optic, an expected loss of some DOF may be induced but with speckle mitigation offered by beam offset diversity. In yet another embodiment, beam offset diversity may be always utilized with a tradeoff on DOF. However, these are merely example implementations of beam offset diversity to obtain speckle reduction, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to apparent speckle reduction via beam offset diversity in pupil space and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a light source for generating a beam of light;
a scanning platform capable of generating a scanned image with the beam of light from the light source; and
a beam offset diversity generator capable of receiving the beam of light to generate a beam offset pattern in pupil space to result in a reduced speckle contrast in the scanned image at a display screen onto which the scanned image is projected, wherein the beam offset diversity generator comprises a layered mirror having switchable reflectance to generate the beam offset pattern.

2. An apparatus, comprising:

a light source for generating a beam of light;

a scanning platform capable of generating a scanned image with the beam of light from the light source; and a beam offset diversity generator capable of receiving the beam of light to generate a beam offset pattern in pupil space to result in a reduced speckle contrast in the scanned image at a display screen onto which the scanned image is projected, wherein the beam offset diversity generator comprises a pair of spatial light modulators to operate as a variable beam expander or as a spot to annular ring beam shifter to generate the beam offset pattern.

3. An apparatus, comprising:

a light source for generating a beam of light;

a scanning platform capable of generating a scanned image with the beam of light from the light source; and a beam offset diversity generator capable of receiving the beam of light to generate a beam offset pattern in pupil space to result in a reduced speckle contrast in the scanned image at a display screen onto which the scanned image is projected, wherein the beam offset diversity generator comprises a frustrated total internal reflector that is electrically induced to generate the beam offset pattern.

\* \* \* \* \*